United States Patent
Harada et al.

(10) Patent No.: US 9,599,058 B2
(45) Date of Patent: Mar. 21, 2017

(54) CONTROL DEVICE OF GASOLINE DIRECT-INJECTION ENGINE

(71) Applicant: Mazda Motor Corporation, Aki-gun, Hiroshima (JP)

(72) Inventors: Yuji Harada, Higashihiroshima (JP); Hiroyuki Yamashita, Hiroshima (JP); Masahiko Fujimoto, Hiroshima (JP); Masatoshi Seto, Hatsukaichi (JP)

(73) Assignee: Mazda Motor Corporation, Hiroshima (JP)

( * ) Notice: Subject to any disclaimer, the term of this patent is extended or adjusted under 35 U.S.C. 154(b) by 71 days.

(21) Appl. No.: 14/592,864

(22) Filed: Jan. 8, 2015

(65) Prior Publication Data

US 2015/0211431 A1   Jul. 30, 2015

(30) Foreign Application Priority Data

Jan. 30, 2014   (JP) .................................. 2014-015439

(51) Int. Cl.
  *F02D 41/38*   (2006.01)
  *F02B 17/00*   (2006.01)
  (Continued)

(52) U.S. Cl.
  CPC ............ *F02D 41/38* (2013.01); *F02B 17/005* (2013.01); *F02B 23/0636* (2013.01);
  (Continued)

(58) Field of Classification Search
  CPC ...... F02B 17/005; F02B 77/11; F02D 41/402; F02D 41/182; F02D 41/0002;
  (Continued)

(56) References Cited

U.S. PATENT DOCUMENTS

| | | | |
|---|---|---|---|
| 2002/0078684 A1* | 6/2002 | Carberry | F01N 3/023 60/295 |
| 2012/0265425 A1* | 10/2012 | Maruyama | F02D 41/0002 701/104 |

(Continued)

FOREIGN PATENT DOCUMENTS

JP   201357268 A   3/2013

*Primary Examiner* — Joseph Dallo
(74) *Attorney, Agent, or Firm* — Alleman Hall McCoy Russell & Tuttle LLP

(57) ABSTRACT

A control device of a gasoline direct-injection engine is provided. The control device includes an engine body, an injector, and a controller. Within a high load operating range, the controller causes the injector to perform a pre-injection and a post injection. In the pre-injection, the fuel is injected to cause a fuel concentration within an in-cylinder radially peripheral section to be higher than a fuel concentration within an in-cylinder radially central section at a timing for the fuel to ignite. In the post injection, the fuel is injected to cause the fuel concentration within the radially central section to be higher than the fuel concentration within the radially peripheral section at a timing for the fuel to ignite. The timing for the fuel injected in the post injection to ignite is after an oxidative reaction of the fuel injected in the pre-injection occurs and after a compression top dead center.

12 Claims, 12 Drawing Sheets

(51) Int. Cl.
F02D 41/40 (2006.01)
F02B 23/06 (2006.01)
F02F 3/14 (2006.01)
F02B 23/10 (2006.01)
F02B 77/02 (2006.01)
F02B 77/11 (2006.01)
F02D 41/30 (2006.01)
F02P 9/00 (2006.01)
F02F 1/24 (2006.01)

(52) U.S. Cl.
CPC ...... *F02B 23/0648* (2013.01); *F02B 23/0669* (2013.01); *F02B 23/101* (2013.01); *F02B 77/02* (2013.01); *F02B 77/11* (2013.01); *F02D 41/3017* (2013.01); *F02D 41/402* (2013.01); *F02F 3/14* (2013.01); *F02P 9/007* (2013.01); *F02B 2023/0612* (2013.01); *F02B 2023/102* (2013.01); *F02B 2023/103* (2013.01); *F02D 41/3047* (2013.01); *F02D 41/401* (2013.01); *F02D 2041/3052* (2013.01); *F02D 2041/389* (2013.01); *F02F 2001/249* (2013.01); *Y02T 10/12* (2013.01); *Y02T 10/125* (2013.01); *Y02T 10/44* (2013.01)

(58) Field of Classification Search
CPC ......... F02D 2200/501; F02D 2200/602; F02D 2041/001; F02D 2041/389; F02F 3/12; F02F 3/28; Y02T 10/44; F02P 9/007; F05C 2251/048
USPC .......................... 123/294–299; 701/102–105
See application file for complete search history.

(56) References Cited

U.S. PATENT DOCUMENTS

| 2013/0042611 | A1* | 2/2013 | Kaneko | F02D 13/02 60/605.2 |
| 2013/0073183 | A1* | 3/2013 | Cohn | F02D 41/3094 701/104 |
| 2014/0216396 | A1 | 8/2014 | Yamashita et al. | |
| 2015/0144093 | A1* | 5/2015 | Harada | F02B 17/005 123/294 |

\* cited by examiner

SHORT INJECTION INTERVAL

CONTROL DEVICE OF GASOLINE DIRECT-INJECTION ENGINE

BACKGROUND

The present invention relates to a control device of a gasoline direct-injection engine.

Conventionally, gasoline direct-injection engines for retarding an ignition timing of fuel have been known.

For example, JP2013-057268A discloses an engine. In order to reduce a pressure increase rate within a cylinder in combustion (a rate of an in-cylinder pressure change with respect to a crank angle change), the engine controls a combustion timing so that a timing at which the pressure increase rate during motoring of the engine becomes a largest, i.e., most negative value (lowest rate) is in a combustion period. Specifically, the pressure increase rate during the motoring reaches its highest value slightly before a compression top dead center (CTDC), becomes zero at the CTDC, then becomes a negative value after the CTDC, and eventually becomes the largest negative value. In other words, the engine retards an ignition timing to a predetermined timing in the expansion stroke to overlap the combustion period with the timing at which the pressure increase rate during the motoring becomes the largest negative value. Thus, the pressure increase rate in the combustion is reduced and a vibration noise (NVH) level is reduced.

Note that, the phrase "during motoring of the engine" used herein indicates a state of the engine while a crankshaft of the engine is rotated by an electric motor and which is not accompanied by a combustion. For a purpose of research, for example, a comparison of the pressure increase rate within the cylinder based on whether the combustion is caused or not, is performed under this state.

However, since an in-cylinder temperature decreases as the expansion stroke progresses, if the ignition timing is retarded excessively, there is a risk of causing a misfire. Particularly, since a decreasing speed of the in-cylinder temperature in the expansion stroke is higher as the compression ratio of the engine is higher, the ignition timing cannot be retarded much.

SUMMARY

The present invention is made in view of the above situations and extends a period for which an ignition timing can be retarded.

According to one aspect of the present invention, a control device of a gasoline direct-injection engine is provided. The control device includes an engine body having a piston provided in a cylinder, an injector for injecting fuel containing at least gasoline, into the cylinder through a nozzle port, and a controller for controlling an injection mode of the injector. Within a predetermined high load operating range of the engine body, the controller causes the injector to perform a pre-injection and a post injection a multi-stage injection is performed, the multi-stage injection including a plurality of fuel injections that are performed after the pre-injection. In the pre-injection, the fuel is injected to cause a fuel concentration within a radially peripheral section inside the cylinder to be higher than a fuel concentration within a radially central section inside the cylinder at a timing for the fuel to ignite. In the post injection, the fuel is injected to cause the fuel concentration within the radially central section inside the cylinder to be higher than the fuel concentration within the radially peripheral section at a timing for the fuel to ignite. The timing for the fuel injected in the post injection to ignite is after an oxidative reaction of the fuel injected in the pre-injection occurs and after a compression top dead center.

Here, the phrase "the radially peripheral section inside the cylinder" means an outer area of the cylinder when the cylinder internal space is circularly divided into two areas at half of its largest radius. On the other hand, the phrase "the radially central section inside the cylinder" means an inner area of the cylinder when the cylinder is circularly divided into two areas at half of its largest radius.

By the above configuration, fuel spray can be spread more to the radially peripheral section than to the radially central section in the pre-injection, and fuel spray can be spread more to the radially central section than to the radially peripheral section in the post injection.

Specifically, since the post injection is the multi-stage injection including the plurality of fuel injections, the fuel spray tends to gather toward the radial center of the cylinder. More specifically, when the fuel is injected, due to the Coanda effect, a negative pressure area is created near the nozzle port. Although pressure within the negative pressure area eventually resumes, if the fuel is continuously injected, the negative pressure area caused by each fuel injection is formed one after another, and thus, negative pressure is maintained within the negative pressure area, which causes the negative pressure area to enlarge. As a result, the fuel spray is attracted to the negative pressure area and its spread in the radial directions is suppressed. In other words, by performing the multi-stage injection, the fuel spray of the post injection tends to gather in the radially central section inside the cylinder. Therefore, when the fuel ignites, the distribution of the fuel spray of the post injection becomes as follows: the fuel concentration within the radially central section inside the cylinder is higher than the fuel concentration within the radially peripheral section.

Note that, the pre-injection is performed in a mode in which it is easier for the fuel spray to spread far compared to the post injection, such as in a single injection mode or if it is a multi-stage injection, a mode in which the injection interval between adjacent fuel injections is longer than it is in the post injection.

In such fuel injection modes, first, the fuel of the pre-injection is oxidized. Since the fuel of the pre-injection exists more within the radially peripheral section inside the cylinder than within the radially central section as described above, inside the cylinder, a temperature within the radially peripheral section sharply increases. Here, either the mixture gas or the air within the radially central section inside the cylinder is compressed while substantially being insulated, and accordingly, a temperature within the radially central section increases. The temperature increase within the radially central section caused by the heat-insulated compression is smaller than the temperature increase within the radially peripheral section caused by the oxidative reaction of the fuel. For example, the temperature within the radially peripheral section increases by a few 100K, whereas the temperature within the radially central section increases by a few 10K.

Further, the fuel of the post injection ignites at the timing after the oxidative reaction of the fuel of the pre-injection occurs and after the compression top dead center. After the compression top dead center, the in-cylinder temperature decreases by expansion stroke. If the in-cylinder temperature decreases excessively, it becomes difficult for the fuel of the post injection to ignite after the compression top dead center. On the other hand, by causing the oxidative reaction of the fuel of the pre-injection before the ignition of the fuel of the post injection, the in-cylinder temperature after the compression top dead center can be increased. Thus, even after the compression top dead center, the fuel of the post injection can be ignited.

However, if the in-cylinder temperature is excessively high, when the post injection is performed, the fuel locally ignites before being sufficiently mixed with the air and soot may be generated. However, by distributing the fuel of the pre-injection mainly to the radially peripheral section and the fuel of the post injection mainly to the radially central section to cause the oxidative reaction of the fuel of the pre-injection prior to the ignition of the fuel of the post injection, the temperature within the radially central section after the compression top dead center can be controlled to a temperature that is not excessively low nor high in performing retarded combustion. As a result, the retarded combustion can be realized without causing a misfire and with a reduced generation of soot.

Moreover, the injector may adjust an effective cross-sectional area of the nozzle port. The post injection may include a plurality of fuel injections in which the effective cross-sectional area of the nozzle port is smaller than it is in the pre-injection.

According to the above configuration, when the effective cross-sectional area of the nozzle port is changed, the particle diameter of the fuel spray injected from the nozzle port changes. When the particle diameter of the fuel spray changes, the kinetic momentum of the fuel spray changes. When the kinetic momentum of the fuel spray changes, the spreading distance of the fuel spray changes. Specifically, as the effective cross-sectional area of the nozzle port becomes smaller, the particle diameter of the fuel spray becomes smaller and the spreading distance of the fuel spray becomes shorter.

Thus, with the pre-injection, since the effective cross-sectional area of the nozzle port is larger than that in the post injection, the kinetic momentum of the fuel spray is relatively large, and the fuel spray easily spreads far. In other words, the fuel spray of the pre-injection easily extends to the radially peripheral section inside the cylinder. On the other hand, with the post injection, since it includes the plurality of fuel injections in which the effective cross-sectional area of the nozzle port is smaller than that in the pre-injection, the kinetic momentum of the fuel spray becomes relatively small, and the fuel spray easily remains within the radially central section inside the cylinder.

Moreover, the effective cross-sectional area of the nozzle port affects an ease with which the negative pressure area affects the fuel spray. In other words, since the particle diameter of the fuel spray is small when the effective cross-sectional area of the nozzle port is small, the fuel spray is easily influenced by the negative pressure area. The fuel spray with the small particle diameter is easily attracted to the negative pressure area and, thus, easily decelerates. Therefore, by reducing the effective cross-sectional area of the nozzle port in the multiple injections that form the multi-stage injection of the post injection, the fuel spray can be gathered within the radially central section inside the cylinder more easily.

Further, EGR gas may not be circulated into the cylinder within the predetermined high load operating range where the pre-injection and the post injection are performed.

According to the above configuration, since the EGR gas which is inactive gas is not circulated into the cylinder, the ignitability of the fuel of the pre-injection can be improved, which results in stimulating the oxidative reaction of the fuel of the pre-injection prior to the fuel of the post injection.

Moreover, since the EGR gas is inactive gas, it has an effect of slowing the combustion and reducing a pressure increase rate. However, since the EGR gas is not circulated within the predetermined high load operating range, the pressure increase rate is generally difficult to reduce. On the other hand, according to the above configuration, since the combustion of the fuel of the post injection can be retarded, the pressure increase rate can be reduced.

Further, the post injection may be started before the compression top dead center and ended after the compression top dead center.

Further, an air excess ratio may be set to be 1 or lower within the predetermined high load operating range where the pre-injection and the post injection are performed.

Furthermore, the injector may include a nozzle body formed with the nozzle port, and a valve body for opening and closing the nozzle port, and the effective cross-sectional area of the nozzle port may change according to the lift of the valve body.

According to this injector, by controlling the lift of the valve body, the effective cross-sectional area of the nozzle port can be adjusted, and as a result, the particle diameter of the fuel spray can be changed.

According to another aspect of the present invention, a control device of a gasoline direct-injection engine is provided. The control device includes an engine body having a piston provided in a cylinder, an injector for injecting fuel containing at least gasoline into the cylinder through a nozzle port, and a controller for controlling an injection mode of the injector. The injector adjusts an effective cross-sectional area of the nozzle port. Within a predetermined high load operating range of the engine body, the controller causes the injector to perform a pre-injection and a post injection a multi-stage injection is performed, the multi-stage injection including a plurality of fuel injections that are performed after the pre-injection. The post injection includes a plurality of fuel injections in which the effective cross-sectional area of the nozzle port is relatively smaller than that in the pre-injection, and the post injection is performed such that the fuel injected in the post injection ignites at a timing after an oxidative reaction of the fuel injected in the pre-injection occurs and after a compression top dead center.

According to the above configuration, since the effective cross-sectional area of the nozzle port in the pre-injection is relatively large, the fuel spray of the pre-injection has a large kinetic momentum and easily spreads far. As a result, a fuel concentration within a radially peripheral section inside the cylinder is higher than a fuel concentration within a radially central section inside the cylinder at a timing for the fuel of the pre-injection to ignite.

On the other hand, since the effective cross-sectional area of the nozzle port in the post injection is relatively small, the fuel spray of the post injection has a small kinetic momentum and the spreading distance of the fuel spray is relatively short. Moreover, since the post injection includes the multiple fuel injections that form the multi-stage injection, a large negative pressure area is formed compared to the negative pressure area that is formed in the pre-injection, and the spread of the fuel spray in the radial directions of the cylinder is suppressed. Since the fuel spray of the post injection has the small kinetic momentum as described above, it easily receives the influence of the negative pressure area, and the spread of the fuel spray in the radial directions is suppressed more. These factors combine, and the fuel spray of the post injection easily spreads within the radially central section inside the cylinder. As a result, the fuel concentration within the radially central section inside the cylinder is higher than the fuel concentration within the radially peripheral section at a timing for the fuel of the post injection to ignite.

In such a fuel injection mode, first, the fuel of the pre-injection is oxidized. Since the fuel of the pre-injection exists more within the radially peripheral section inside the cylinder than within the radially central section as described above, inside the cylinder, a temperature within the radially peripheral section sharply increases. Here, either the mixture gas or the air within the radially central section inside the cylinder is compressed while substantially being insulated, and accordingly, a temperature within the radially central section increases. The temperature increase within the radially central section caused by the heat-insulated compression is smaller than the temperature increase within the radially peripheral section caused by the oxidative reaction of the fuel. For example, the temperature within the radially peripheral section increases by a few 100K, whereas the temperature within the radially central section increases by a few 10K.

Thus, by increasing the temperature inside the radially central section by oxidizing the fuel within the radially peripheral section, the temperature within the radially central section after the compression top dead center can be controlled to a temperature that is not excessively low or high in performing retarded combustion. As a result, retarded combustion can be realized without causing a misfire and with a reduced generation of soot.

According to the above configurations, a period for which an ignition timing can be retarded can be extended.

DETAILED DESCRIPTION OF EMBODIMENTS

Hereinafter, one illustrative embodiment of the present invention is described with reference to the appended drawings.

Figure 1:
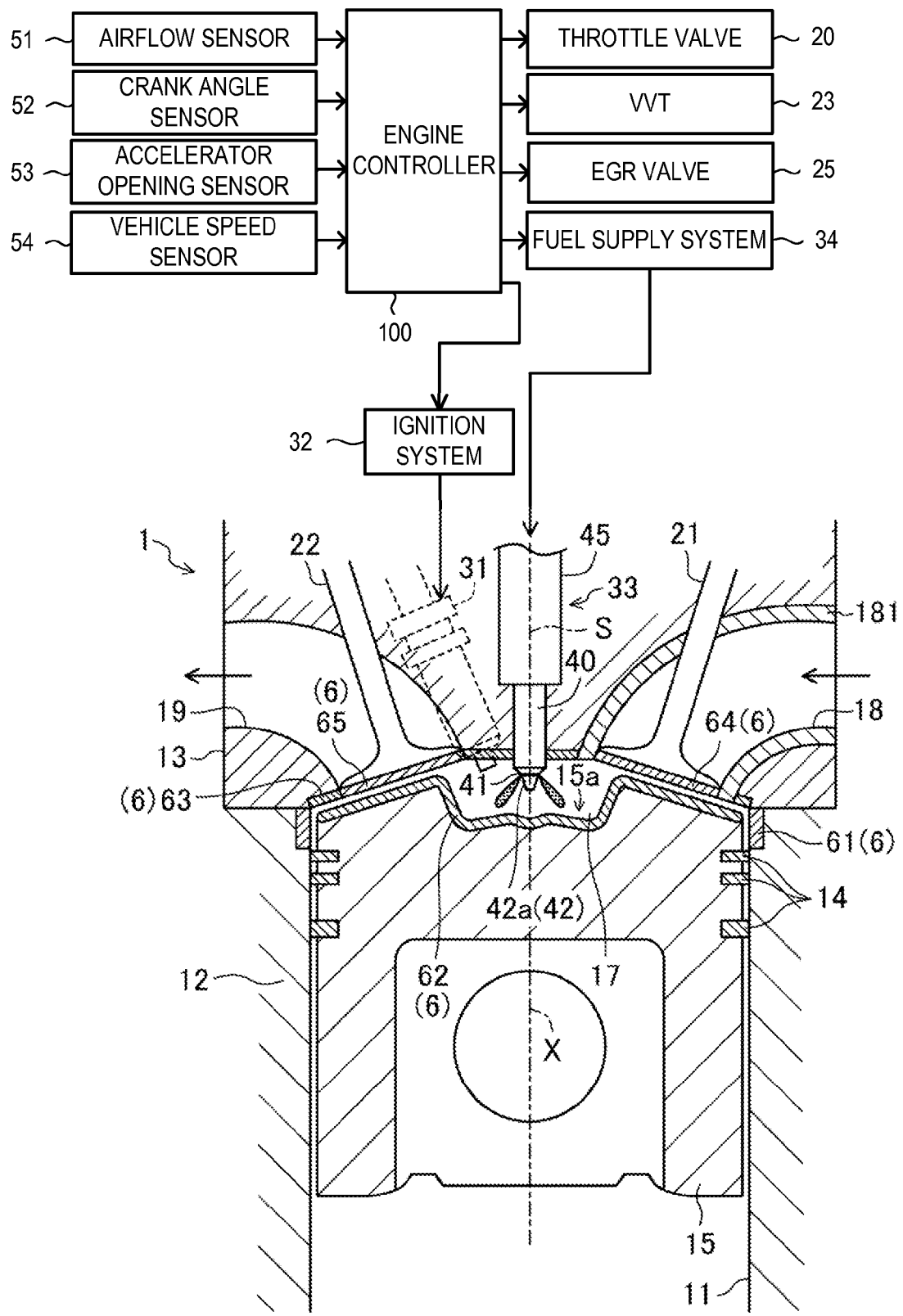
FIG. 1 is a schematic view illustrating a gasoline direct-injection engine according to one embodiment of the present invention.

FIG. 1 is a schematic view illustrating a gasoline direct-injection engine (hereinafter, simply referred to as an "engine") 1 according to this embodiment of the present invention. In this embodiment, the engine 1 includes various actuators and various sensors associated with an engine body of the engine 1, and an engine controller 100 for controlling the actuators based on signals from the sensors.

The engine 1 is installed in a vehicle (e.g., an automobile), and an output shaft of the engine 1 is, although not illustrated, coupled to the drive wheels via a transmission. The output of the engine 1 is transmitted to the drive wheels so as to drive the vehicle. The engine body of the engine 1 includes a cylinder block 12 and a cylinder head 13 placed on the cylinder block 12. A plurality of cylinders 11 are formed inside the cylinder block 12 (only one cylinder 11 is illustrated in FIG. 1). A water jacket (not illustrated) through which cooling water flows is formed inside the cylinder block 12 and the cylinder head 13.

Here, fuel of the engine 1 is gasoline in this embodiment. The gasoline may also contain bioethanol, or it may be any kind of fuel as long as it is a liquid fuel at least containing gasoline.

A plurality of pistons 15 are reciprocatably inserted into the cylinders 11, respectively. Each piston 15 forms a combustion chamber 17 together with the cylinder 11 and the cylinder head 13. In FIG. 1, the combustion chamber 17 is a so-called pent-roof type, and a ceiling surface of the combustion chamber 17 (i.e., a bottom surface of the cylinder head 13) has a triangular roof-like shape formed by an intake-side inclined surface portion and an exhaust-side inclined surface portion. A crown surface of the piston 15 has a bulging shape corresponding to the ceiling surface, and a concave cavity (concaved portion) 15a is formed in a central portion of the crown surface. Note that, the shapes of the ceiling surface and the crown surface of the piston 15 may be any shape as long as a high geometric compression ratio which is described later can be achieved. For example, both the ceiling surface and the crown surface of the piston 15 (except the portion corresponding to the cavity 15a) may be formed by a surface perpendicular to a central axis of the cylinder 11, or the ceiling surface may have the triangular roof-like shape as described above while the crown surface of the piston 15 (except the portion corresponding to the cavity 15a) is formed by a surface perpendicular to the central axis of the cylinder 11.

Although only one is illustrated in FIG. 1, a pair of intake ports 18 are formed in the cylinder head 13 for each cylinder 11, and they communicate with the combustion chamber 17 by opening to the bottom surface of the cylinder head 13 (i.e., the intake-side inclined surface portion of the ceiling surface of the combustion chamber 17). Similarly, a pair of exhaust ports 19 are formed in the cylinder head 13 for each cylinder 11, and they communicate with the combustion chamber 17 by opening to the bottom surface of the cylinder head 13 (i.e., the exhaust-side inclined surface portion of the ceiling surface of the combustion chamber 17). The intake ports 18 are connected with an intake passage (not illustrated) through which fresh air to be introduced into the cylinder 11 flows. A throttle valve 20 for adjusting an intake air flow rate is provided within the intake passage, and an opening of the throttle valve 20 is adjusted based on a control signal (the desired throttle opening signal is described later) from the engine controller 100. On the other hand, the exhaust ports 19 are connected with an exhaust passage (not illustrated) through which burned gas (i.e., exhaust gas) from the cylinder 11 flows. An exhaust gas purification system having one or more catalyst converters (not illustrated) is disposed in the exhaust passage. Each catalyst converter includes a three-way catalyst.

Intake valves 21 are disposed in the cylinder head 13 to shut off (close) the intake ports 18 against the combustion chamber 17 and exhaust valves 22 are disposed in the cylinder head 13 to shut off (close) the exhaust ports 19 against the combustion chamber 17. Each intake valve 21 is operated by an intake valve operating mechanism, and each exhaust valve 22 is operated by an exhaust valve operating mechanism. The intake and exhaust valves 21 and 22 reciprocate at predetermined timings to open and close the intake and exhaust ports 18 and 19, respectively, and thus, gas within the cylinder 11 is exchanged. The intake and exhaust valve operating mechanisms (not illustrated) have respective intake and exhaust camshafts operably coupled to a crankshaft, and the intake and exhaust camshafts rotate in synchronization with a rotation of the crankshaft. Moreover, at least the intake valve operating mechanism includes a variable phase mechanism (Variable Valve Timing: VVT) 23 driven by a hydraulic force, an electric force or a mechanic force and for continuously varying a phase of the intake camshaft within a predetermined angle range. Note that, a variable lift mechanism for continuously varying a valve lift (Continuous Variable Valve Lift: CVVL) may be provided along with the VVT 23.

Moreover, ignition plugs 31 are disposed in the cylinder head 13. Each ignition plug 31 is fixedly attached to the cylinder head 13 by a known structure (e.g., thread). In FIG. 1, the ignition plug 31 is fixedly attached, inclined to the exhaust side with respect to the central axis of the cylinder 11. A tip of the ignition plug 31 is oriented toward the ceiling portion of the combustion chamber 17 and positioned near a nozzle port 41 of an injector 33 (described later). Note that, the arrangement of the ignition plug 31 is not limited to this. In this embodiment, the ignition plug 31 is a plasma ignition plug, and an ignition system 32 includes a plasma generation circuit. The ignition system 32 generates plasma by a power discharge and the ignition plug 31 performs a plasma jet injection into the cylinder from its tip, so as to ignite the fuel. The ignition system 32 receives a control signal from the engine controller 100 and distributes power to the ignition plug 31 so that it injects the plasma at a desired ignition timing. Note that, the ignition plug 31 is not limited to such a plasma ignition plug, and it may be a spark-ignition plug which is generally used.

The injector 33 for directly injecting the fuel into the cylinder (i.e., the combustion chamber 17) is disposed in the cylinder head 13, on the central axis of the cylinder 11. The injector 33 is fixedly attached to the cylinder head 13 by a well-known structure using a bracket, for example. A tip of the injector 33 is oriented toward a central position of the ceiling portion of the combustion chamber 17.

Figure 2:
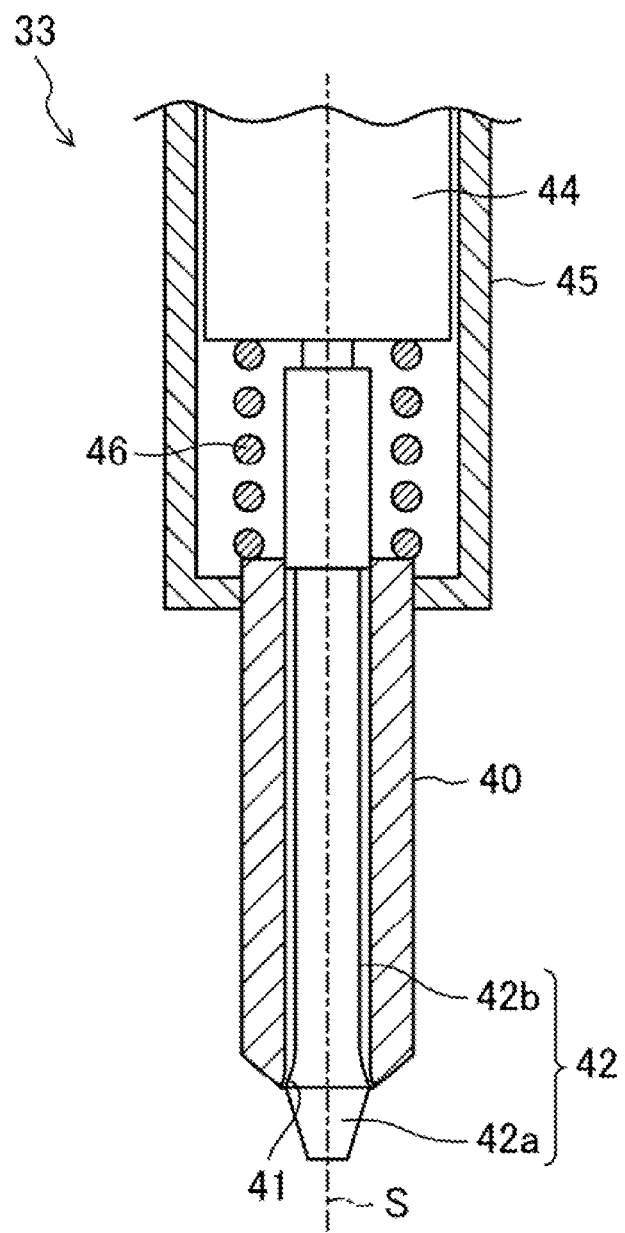
FIG. 2 is a cross-sectional view illustrating an internal structure of an injector.

As illustrated in FIG. 2, the injector 33 is an outward-opening valve injector, having a nozzle body 40 formed with the nozzle port 41 from which the fuel is injected into the cylinder 11, and an outward-opening valve 42 for opening and closing the nozzle port 41. The injector 33 injects the fuel in directions inclined with respect to a predetermined central axis S thereof and spreading radially outward centering on the central axis S, and adjusts an effective cross-sectional area of the nozzle port 41. The nozzle port 41 is an example of the nozzle port of the injector, and the outward-opening valve 42 is an example of the valve body.

The nozzle body 40 is a tubular member extending along the central axis S and the fuel flows inside the nozzle body 40. An opening edge of the nozzle port 41 is formed in a tip portion of the nozzle body 40 so as to have a tapering shape in which its diameter is larger toward the tip. A base end portion of the nozzle body 40 is connected with a case 45 provided therein with a piezo element 44. The outward-opening valve 42 has a valve body 42a and a coupling part 42b extending through the nozzle body 40 from the valve body 42a and connected with the piezo element 44. The valve body 42a is externally exposed from the nozzle body 40 at the tip of the nozzle body 40. A portion of the valve body 42a on the coupling part 42b side has substantially the same shape as the opening edge of the nozzle port 41, and when this portion contacts with (is seated on) the opening edge of the nozzle port 41, the nozzle port 41 is in a closed state.

The injector 33 is arranged in a state where the central axis S matches with the central axis X of the cylinder 11 and the nozzle port 41 is oriented toward the ceiling portion of the combustion chamber 17.

The piezo element 44 deforms by receiving a voltage, and thus it presses the outward-opening valve 42 in the central axial direction to lift the outward-opening valve 42 from the opening edge of the nozzle port 41 of the nozzle body 40, so as to open the nozzle port 41. Here, the fuel is injected in the directions inclining with respect to the central axis S and radially spreading centering on the central axis S. Specifically, the fuel is injected in a cone shape (specifically, a hollow cone shape) centering on the central axis S. A tapering angle of the cone is between 90° and 100° (a tapering angle of an inner hollow section of the hollow cone is about 70°) in this embodiment. Further, when the voltage application to the piezo element 44 is stopped, the piezo element 44 resumes back to the previous state, and thus, the outward opening valve 42 causes the nozzle port 41 to be in the closed state again. Here, a compression coil spring 46 disposed around the coupling part 42b within the case 45 assists the resumption of the piezo element 44.

Figure 7:
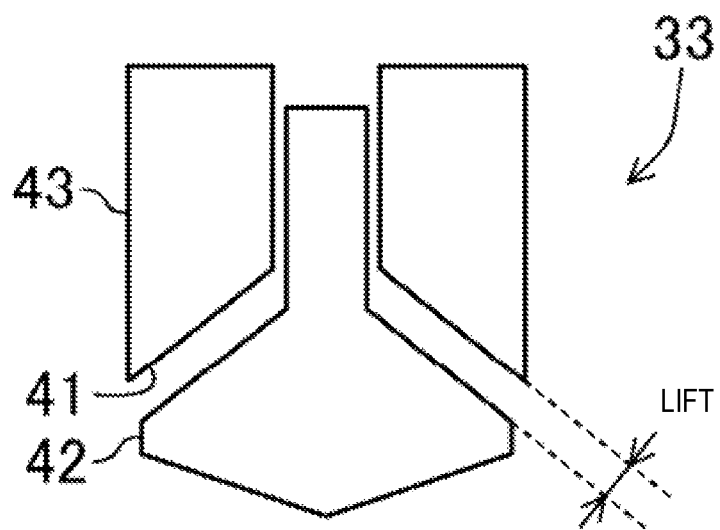
FIG. 7 is a view illustrating a lift of the injector which is an outward-opening valve injector.

As the voltage applied to the piezo element 44 becomes larger, a lift of the outward-opening valve 42 from the state where the nozzle port 41 is closed (hereinafter, simply referred to as the "lift") becomes higher (also see FIG. 7). As the lift becomes higher, the opening of the nozzle port 41 (i.e., effective cross-sectional area) becomes larger and a particle diameter of the fuel spray to be injected into the cylinder from the nozzle port 41 becomes larger. On the other hand, as the lift becomes lower, the opening of the nozzle port 41 becomes smaller and the particle diameter of the fuel spray to be injected into the cylinder from the nozzle port 41 becomes smaller. The response of the piezo element 44 is prompt, and therefore, multi-stage injection (including, e.g., about twenty injections in a single cycle) can be performed. Note that, the operation of the outward-opening valve 42 is not limited to being performed by the piezo element 44.

A fuel supply system 34 includes an electric circuit for operating the outward-opening valve 42 (piezo element 44), and a fuel supply subsystem for supplying the fuel to the injector 33. The engine controller 100 outputs, to the electric circuit at a predetermined timing, an injection signal (fuel injection pulse) having a voltage corresponding to the lift, so as to actuate the piezo element 44 and the outward-opening valve 42 via the electric circuit. Thus, a desired amount of fuel is injected into the cylinder. When the injection signal is not outputted (i.e., when the voltage of the injection signal is zero), the nozzle port 41 is in the state of being closed by the outward-opening valve 42. The operation of the piezo element 44 is controlled as above, by the injection signal from the engine controller 100. Thus, the engine controller 100 controls the operation of the piezo element 44 to control the fuel injection from the nozzle port 41 of the injector 33 and the lift in the fuel injection.

In the fuel supply subsystem, a high-pressure fuel pump and a common rail (both not illustrated) are provided, and the high-pressure fuel pump pumps the fuel supplied from a fuel tank via a low-pressure fuel pump to the common rail, and the common rail stores the pumped fuel at a predetermined fuel pressure. When the injector 33 is activated (i.e., the outward-opening valve 42 is lifted), the fuel stored in the common rail is injected from the nozzle port 41.

The engine controller 100 is a controller based on a well-known microcomputer, and it includes a central processing unit (CPU) for executing a program, a memory comprised of, for example, a RAM and a ROM, for storing the program and data, and an input/output (I/O) bus for inputting and outputting electric signals. The engine controller 100 may be referred to as the controller.

The engine controller 100 at least receives a signal regarding the intake air flow rate from an airflow sensor 51, a crank angle pulse signal from a crank angle sensor 52, an accelerator opening signal from an accelerator opening sensor 53 for detecting a stepped amount of an acceleration pedal, and a vehicle speed signal from a vehicle speed sensor 54. Based on these input signals, the engine controller 100 obtains control parameters of the engine 1, such as the desired throttle opening signal, the fuel injection pulse, an ignition signal, and a valve phase angle signal. Further, the engine controller 100 outputs the signals to the throttle valve 20 (a throttle actuator for operating the throttle valve 20 to be exact), the VVT 23, a later-described EGR valve 25, the fuel supply system 34 (the electric circuit described above to be exact), the ignition system 32, and the like.

A geometric compression ratio ε of the engine 1 is between 15:1 and 40:1. With the engine 1 of this embodiment, "compression ratio=expansion ratio." Therefore, the engine 1 has a comparatively high expansion ratio, as well as the high compression ratio. The geometric compression ratio is increased to improve a thermal efficiency.

As illustrated in FIG. 1, the combustion chamber 17 is formed by the wall surface of the cylinder 11, the crown surface of the piston 15, the bottom surface of the cylinder head 13 (i.e., ceiling surface), and the surfaces of the valve heads of the intake and exhaust valves 21 and 22. Hereinafter, each of the surfaces forming the combustion chamber 17 may be referred to as a "partial surface". Further, in the engine 1, to reduce a cooling loss, heat-insulating layers 61, 62, 63, 64 and 65 are provided to the respective partial surfaces to heat-insulate the combustion chamber 17. Note that, hereinafter, the heat-insulating layers 61 to 65 may collectively be referred to as the heat-insulating layers 6. The heat-insulating layers 6 may be provided to all of the partial surfaces, and may be provided only to a part of each partial surface or one or more of the partial surfaces. Moreover, in FIG. 1, the heat-insulating layer 61 of the cylinder wall surface is provided at a position above a piston ring 14 in a state where the piston 15 is at a top dead center (TDC), so that the piston ring 14 does not slide on the heat-insulating layer 61. Note that, the configuration of the heat-insulating layer 61 of the cylinder wall surface is not limited to this and, by extending the heat-insulating layer 61 downward, it may be provided over the entire stroke of the piston 15 or on a part of the stroke. Moreover, although it is not a wall surface directly forming the combustion chamber 17, a heat-insulating layer may be provided to a part of each of the wall surfaces of the intake ports 18 and/or the exhaust ports 19, near the openings of the corresponding ports on the side of the ceiling surface of the combustion chamber 17. Note that, the thicknesses of the respective heat-insulating layers 61 to 65 in FIG. 1 are merely illustrative and do not indicate their actual thicknesses, and they also do not indicate the relationship among the heat-insulating layers of the respective surfaces in terms of thickness.

The heat-insulating structure of the combustion chamber 17 is described more in detail. As described above, the heat-insulating structure of the combustion chamber 17 is formed by the heat-insulating layers 61 to 65 provided to the respective partial surfaces forming the combustion chamber 17. A heat conductivity of each of the heat-insulating layers 61 to 65 is set lower than its corresponding metal mother member constituting the combustion chamber 17 so as to suppress the heat of combustion gas within the combustion chamber 17 is released through the corresponding partial surface. Here, the cylinder block 12 is the mother member for the heat-insulating layer 61 provided to the wall surface of the cylinder 11, the piston 15 is the mother member for the heat-insulating layer 62 provided to the crown surface of the piston 15, the cylinder head 13 is the mother member for the heat-insulating layer 63 provided to the bottom surface of the cylinder head 13 (ceiling surface), and the intake and exhaust valves 21 and 22 are the mother members for the respective heat-insulating layers 64 and 65 provided to the valve head surfaces of the intake and exhaust valves 21 and 22. Therefore, as the material of each mother member, either aluminum alloy or cast iron is adopted for the cylinder block 12, the cylinder head 13, and the piston 15, and any one of heat-resistant steel, cast iron or the like is adopted for the intake and exhaust valves 21 and 22.

Moreover, each heat-insulating layer 6 preferably has a smaller volumetric specific heat than the corresponding mother member, in view of reducing the cooling loss. Specifically, although a gas temperature within the combustion chamber 17 varies depending on the progression of the combustion cycle, with the conventional engine without the heat-insulating structure of the combustion chamber 17, the cooling water flows inside the water jacket formed in the cylinder head and the cylinder block and, thus, the temperature of each surface forming the combustion chamber 17 is maintained substantially fixed regardless of the progression of the combustion cycle.

On the other hand, since the cooling loss is determined based on "cooling loss=heat transmissibility×heat transmission area×(gas temperature−partial surface temperature)," the cooling loss becomes larger as a difference between the gas temperature and the wall surface temperature becomes larger. To suppress the cooling loss, although it is preferred to reduce the difference between the gas temperature and the partial surface temperature, when the temperature of the partial surface of the combustion chamber 17 is maintained substantially fixed by the cooling water, it is unavoidable that the temperature difference increases due to the variation of the gas temperature. Thus, it is preferred to reduce a heat capacity of the heat-insulating layer 6 so that the temperature of the partial surface of the combustion chamber 17 changes following the variation of the gas temperature within the combustion chamber 17.

The heat-insulating layer 6 may be formed by plasma thermal spray of a ceramic material (e.g., $ZrO_2$) to coat the mother member. The ceramic material may contain multiple micro-pores. In this manner, the heat conductivity and volumetric specific heat of each heat-insulating layer 6 can be even lower.

Moreover, in this embodiment, as illustrated in FIG. 1, aluminum titanic acid-made port liners 181 having extremely low heat conductivity and excellent in heat-insulating properties and also heat resistance properties are integrally casted with the cylinder head 13 to provide the heat-insulating layers to the respective intake ports 18. With this configuration, a temperature increase of the fresh air by receipt of heat from the cylinder head 13 when the fresh air passes through the intake ports 18 can be suppressed or avoided. Thus, the temperature of the fresh air introduced into the cylinder 11 (gas temperature in an early stage) becomes low, and therefore, the gas temperature in the combustion decreases, which is advantageous in reducing the difference between the gas temperature and the temperature of the partial surface of the combustion chamber 17. Since the reduction of the gas temperature in the combustion can reduce the heat transmissibility, this configuration is also advantageous in reducing the cooling loss. Note that, the configuration of the heat-insulating layer provided to the intake ports 18 is not limited to the integral casting of the port liners 181.

In this engine 1, the geometric compression ratio $\epsilon$ is set to be 15:1≤$\epsilon$≤40:1 as described above. A theoretical thermal efficiency $\eta_{th}$ in the Otto cycle, which is a theoretical cycle, is $\eta_{th}=1-1/(\epsilon^{\kappa-1})$, and as the compression ratio $\epsilon$ is increased, the theoretical thermal efficiency $\eta_{th}$ becomes higher. However, the indicated thermal efficiency of the engine (the engine without the heat-insulating structure of the combustion chamber to be exact) reaches its peak at a predetermined geometric compression ratio $\epsilon$ (e.g., about 15:1). Thus, if the geometric compression ratio $\epsilon$ is further increased, the indicated thermal efficiency does not increase but rather decreases, which is why in a case where the geometric compression ratio is increased while a fuel amount and an intake air amount are fixed, a combustion pressure and a combustion temperature increase as the compression ratio increases, and why the increase of the combustion pressure and the combustion temperature leads to the increase of the cooling loss as described above.

In this regard, the engine 1 of this embodiment is combined with the heat-insulating structure of the combustion chamber 17 as described above, so that the indicated thermal efficiency improves at the high geometric compression ratio $\epsilon$. In other words, the cooling loss is reduced by the heat insulation of the combustion chamber 17, so as to improve the indicated thermal efficiency.

On the other hand, the reduction of the cooling loss by heat insulating the combustion chamber 17 generally does not contribute much in improving the indicated thermal efficiency by itself since the reduced amount of the cooling loss is converted into an exhaust loss; however, with the engine 1 of this embodiment, as described above, by the high expansion ratio due to the high compression ratio, the energy of the combustion gas corresponding to the reduced amount of the cooling loss is efficiently changed into machinery work. In other words, it can be said that the engine 1 is significantly improved in the indicated thermal efficiency by adopting the configuration with which both the cooling and exhaust losses can be reduced.

In the engine 1 of this embodiment, a heat-insulating layer is formed inside the cylinder (combustion chamber 17) by a gas layer in addition to the heat-insulating structures of the combustion chamber 17 and the intake ports 18, so as to further reduce the cooling loss, which will be described in detail below.

Figure 3:
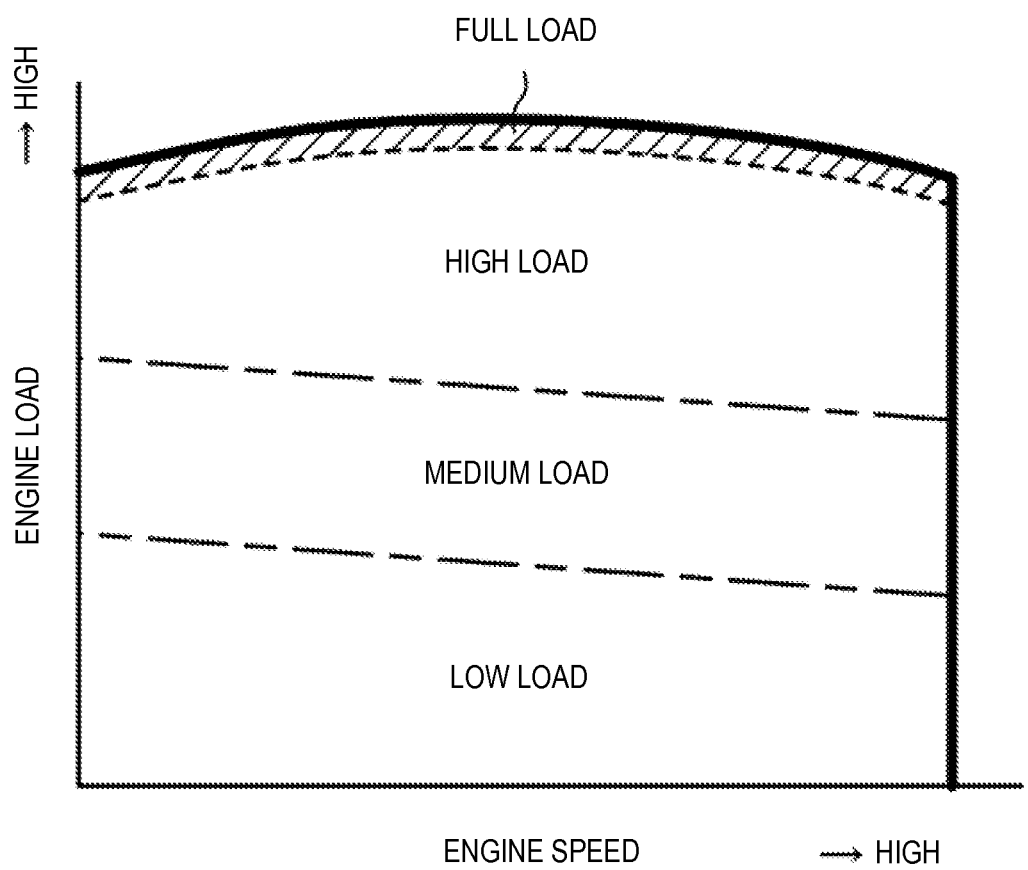
FIG. 3 is a map illustrating an example of an operation map of the engine.

FIG. 3 is a map illustrating an example of an operation map of the engine 1 in a warmed-up state. In all operating ranges, the engine 1 basically combusts the mixture gas within the combustion chamber 17 by compression self-ignition. In the operation map of FIG. 3, within a low engine load range where an engine load is lower than a predetermined load and a medium engine load range where the engine load is higher than the low engine load range, the heat-insulating layer is formed inside the combustion chamber 17 by the gas layer. In other words, when the engine load is comparatively low and the fuel injection amount is comparatively low because of the low engine load, the heat-insulating layer is formed inside the combustion chamber 17 by the gas layer to reduce the cooling loss and improve the thermal efficiency. Here, the low and medium engine load ranges may be defined as such that they correspond to low and medium ranges when the entire engine load range is divided into three ranges of low, medium and high (e.g., evenly divided into three), respectively. Particularly for the medium engine load range, it may be a range lower than a predetermined load (e.g., lower than 70%) with respect to a full engine load.

Figure 4:
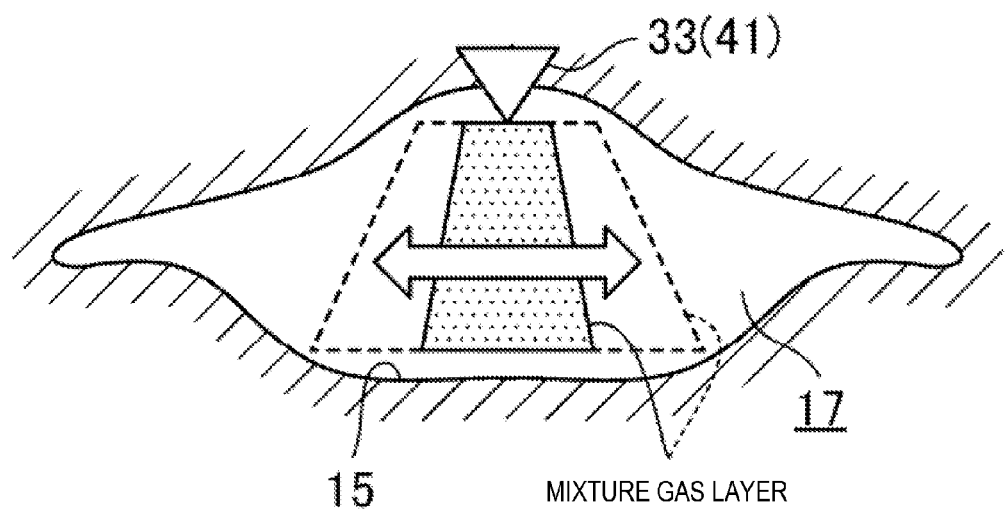
FIG. 4 is a conceptual cross-sectional view illustrating a shape of a mixture gas layer formed within a combustion chamber.

FIG. 4 is a schematic cross-sectional view illustrating a shape of a mixture gas layer formed within the combustion chamber 17 within the low and medium engine load ranges. The phrase "the heat-insulating layer is formed inside the combustion chamber 17 by the gas layer" means that the mixture gas layer is formed within a central section inside the combustion chamber 17 and a gas layer containing fresh air is formed around the mixture gas layer. The gas layer may contain the fresh air alone or contain the burned gas (i.e., EGR gas) in addition to the fresh air. Note that, a slight amount of fuel is allowed to be mixed in the gas layer as long as the gas layer can function as the heat-insulating layer, as described below.

By reducing a ratio between a surface area (S) and volume (V) of the mixture gas layer (S/V ratio), the heat transmission area of the mixture gas layer with the gas layer therearound becomes smaller during combustion, the flame within the mixture gas layer is prevented from being in contact with the wall surface of the cylinder 11 by the gas layer between the mixture gas layer and the wall surface of the cylinder 11, and moreover, the gas layer itself serves as the heat-insulating layer and the heat release from the wall surface of the cylinder 11 can be suppressed. As a result, the cooling loss can significantly be reduced.

The engine controller 100 outputs the injection signal to the electric circuit of the fuel supply system 34 in order to inject the fuel into the cylinder 11 from the nozzle port 41 of the injector 33 in a period from a latter half of compression stroke to an early stage of expansion stroke, so that the mixture gas layer is formed within the central section inside the combustion chamber 17 and the gas layer is formed around the mixture gas layer.

Within the low engine load range, since the fuel injection amount is relatively low, the radial spread of the fuel spray is suppressed by injecting the fuel into the cylinder from the injector 33 disposed on the central axis X of the cylinder 11 in the period from the latter half of the compression stroke to the early stage of the expansion stroke, and thus, the formation of the mixture gas layer within the central section inside the combustion chamber 17 and the gas layer around the mixture gas layer can be comparatively easy to achieve. However, as the fuel injection amount increases, an overall fuel injection period extends, and therefore, the fuel spray spreads particularly along the central axis X of the cylinder 11. As a result, the mixture gas layer touches the crown surface of the piston 15, etc. In other words, the gas layer around the mixture gas layer may not surely be formed. As described above, the engine 1 of this embodiment has a high geometric compression ratio and thus the capacity of the combustion chamber (i.e., the cylinder interior space when the piston is at the compression top dead center) is small. Therefore, in this engine 1, the mixture gas layer easily touches the crown surface of the piston 15 when the fuel spray spreads along the central axis X of the cylinder 11.

Thus, the engine 1 controls the shape of the mixture gas layer to be formed inside the combustion chamber 17 so as to surely form the mixture gas layer within the central section inside the combustion chamber 17 and the gas layer around the mixture gas layer even within the medium engine load range where the fuel injection amount increases. Specifically, as indicated by the white arrows in FIG. 4, when the fuel injection amount is increased, the fuel is injected so that the fuel spray spreads outward in the radial directions which intersect with the central axis X of the cylinder 11. In this manner, while the length of the mixture gas layer along the central axis X is suppressed to avoid contact of the mixture gas layer with the crown surface of the piston 15, the mixture gas layer is expanded outward in the radial directions, which are more spacious than along the central axis X, so as to also avoid the contact of the mixture gas layer with the inner wall of the cylinder 11. The control of the shape of the mixture gas layer to be formed inside the combustion chamber 17 leads to adjusting, when a length of the mixture gas layer in the central axial directions is L and a width of the mixture gas layer in the radial directions is W, a ratio (L/W) between the length L and the width W, and, this control reduces the L/W ratio when the fuel injection amount is increased, while keeping the L/W ratio higher than a predetermined ratio in reducing the S/V ratio described above.

Figure 5:
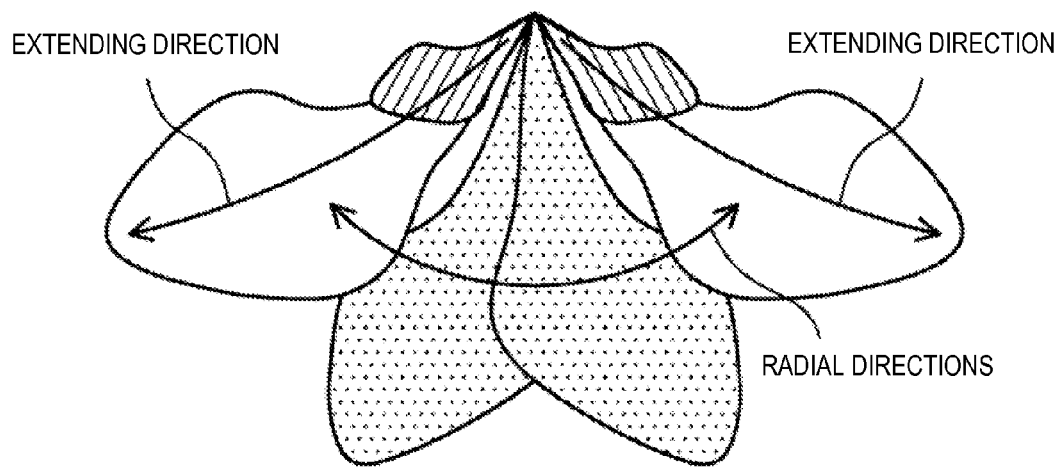
FIG. 5 is a view describing the spread of the fuel spray injected from the injector.
Figure 6:
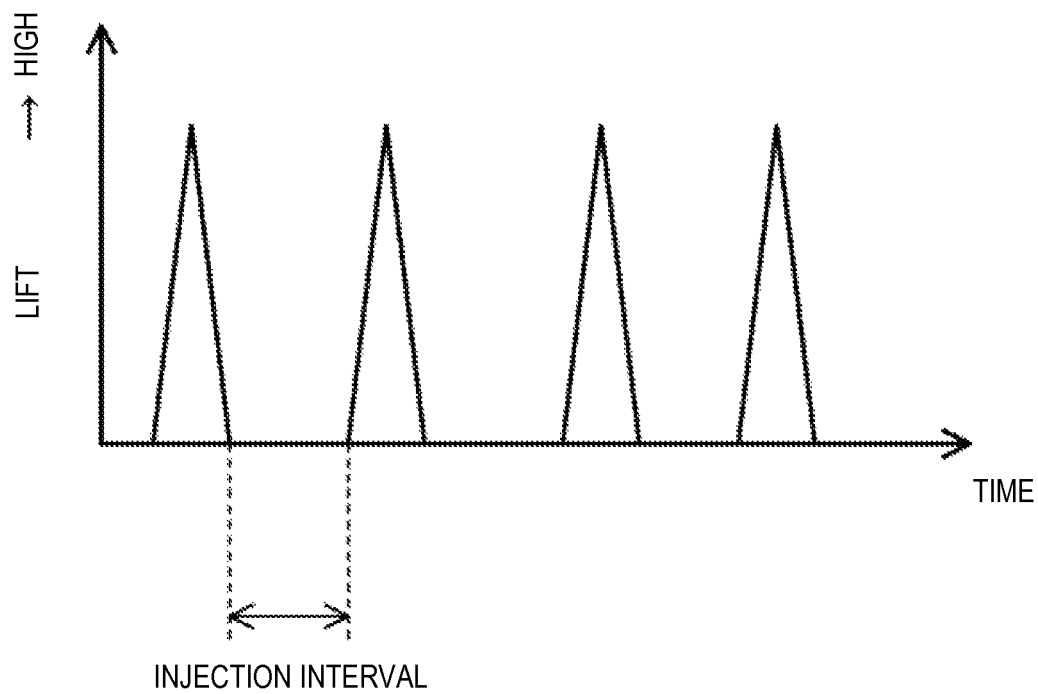
FIG. 6 is a view illustrating a fuel injection interval.

To achieve such a control of the shape of the mixture gas layer, in the engine 1, an interval (see FIG. 6) between adjacent fuel injections by the injector 33, and the lift (see FIG. 7) in each fuel injection, are adjusted. Thus, as illustrated in FIG. 5, the spread of the fuel spray in its extending directions, and the spread of the fuel spray in the radial directions, are each independently controlled. As conceptually illustrated in FIG. 6, the fuel injection interval is defined as an interval from an end of a fuel injection to a start of the next fuel injection. As described above, the injector 33 is highly responsive and can perform a multi-stage injection including about twenty injections within 1 ms to 2 ms. Moreover, as conceptually illustrated in FIG. 7, the lift of the injector 33 is proportionate to a fuel injection opening area, and as described above, the fuel injection opening area (i.e., the effective cross-sectional area of the nozzle port 41) becomes larger as the lift becomes higher, and the fuel injection opening area becomes smaller as the lift becomes lower.

Figure 8A:
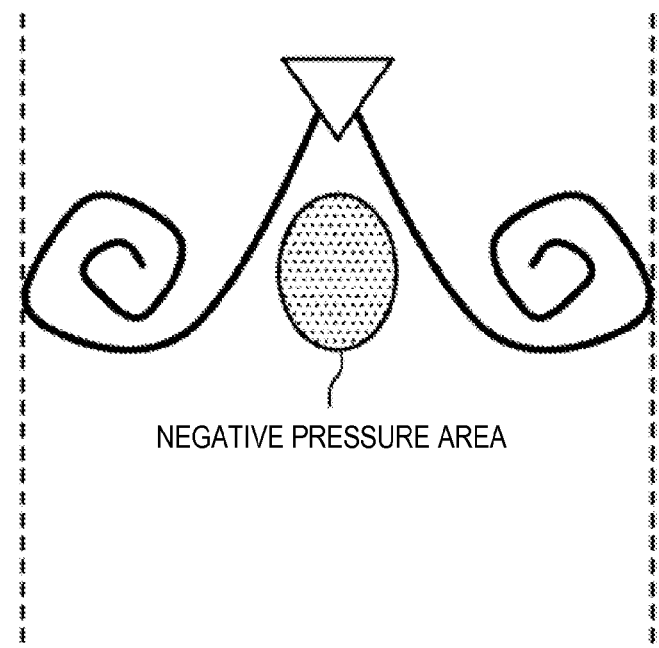
FIG. 8A is a conceptual view illustrating how the fuel spray spreads when the fuel injection interval is long.
Figure 8B:
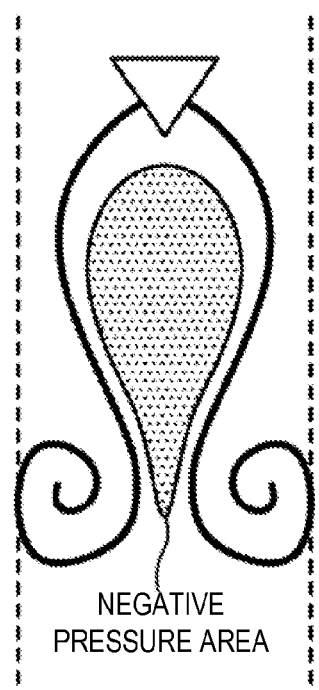
FIG. 8B is a conceptual view illustrating how the fuel spray spreads when the fuel injection interval is short.

FIG. 8A is a conceptual view illustrating how the fuel spray spreads when the fuel injection interval is long and FIG. 8B is a conceptual view illustrating how the fuel spray spreads when the fuel injection interval is short, while the lift of the injector 33 is fixed. The fuel spray injected in the hollow cone shape from the injector 33 flows inside the combustion chamber 17 at a high speed. Therefore, due to the Coanda effect, a negative pressure area is created inside the hollow cone along the central axis S of the injector 33. When the fuel injection interval is long, after the fuel injection, the pressure in the negative pressure area resumes before the next fuel injection is performed, and therefore, the negative pressure area shrinks. On the other hand, when the fuel injection interval is short, since the fuel injection is continuously repeated, the resumption of pressure in the negative pressure area is suppressed. As a result, the negative pressure area enlarges as illustrated in FIG. 8B.

The fuel spray is attracted to the negative pressure. Since the negative pressure area is formed around the origin of the radial directions centering on the central axis S, when the negative pressure area is relatively large, as illustrated in FIG. 8B, the spread of the fuel spray in the radial directions is suppressed. On the other hand, when the negative pressure area is relatively small, as illustrated in FIG. 8A, the fuel spray is not attracted much to the negative pressure, and therefore, it easily spreads in the radial directions. In other words, by shortening the interval between the fuel injections from the injector 33, the spread of the fuel spray in the radial directions can be suppressed, whereas, by extending the injection interval, the spread of the fuel spray in the radial directions can be stimulated.

Figure 9A:
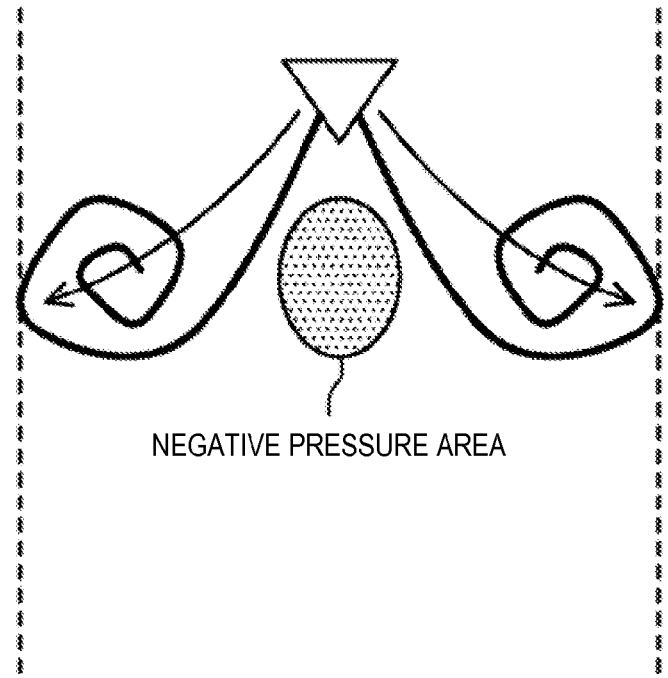
FIG. 9A is a conceptual view illustrating how the fuel spray spreads when the lift of the injector is low.
Figure 9B:
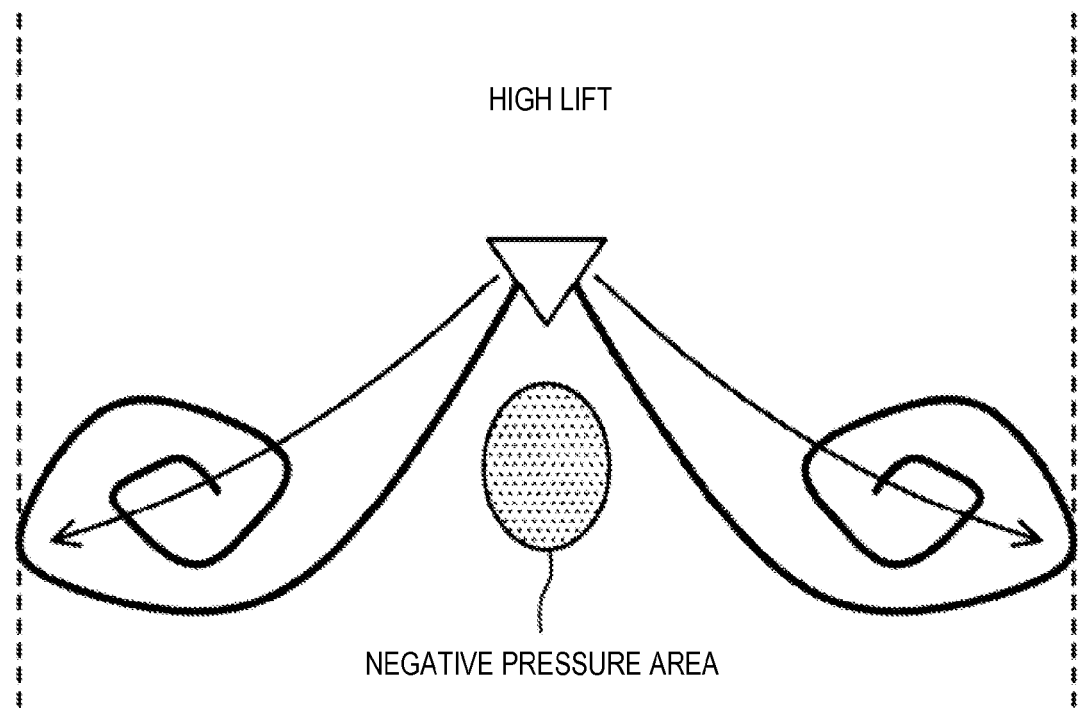
FIG. 9B is a conceptual view illustrating how the fuel spray spreads when the lift of the injector is high.

FIG. 9A is a conceptual view illustrating how the fuel spray spreads when the lift of the injector 33 is low and FIG. 9B is a conceptual view illustrating how the fuel spray spreads when the lift of the injector 33 is high, while the fuel injection interval is fixed. In this case, although the negative pressure area within the combustion chamber 17 becomes the same since the injection interval is the same, since the lifts are different, the particle diameters of the fuel spray are different. In other words, when the lift of the injector 33 is reduced, since the particle diameter of the fuel spray becomes smaller, the kinetic momentum of the fuel spray becomes smaller. Therefore, as illustrated in FIG. 9A, the spreading distance of the fuel spray in the extending directions becomes shorter. On the other hand, when the lift of the injector 33 is increased, since the particle diameter of the fuel spray becomes larger, the kinetic momentum of the fuel spray becomes larger. Therefore, as illustrated in FIG. 9B, the spreading distance of the fuel spray in the extending directions becomes longer.

Additionally, the lift also affects an ease of causing influence on the fuel spray from the negative pressure area. When the lift of the injector 33 is low and the particle diameter of the fuel spray is small, the fuel spray is easily attracted toward the origin of the radial directions by the negative pressure, and as illustrated in FIG. 9A, the radially outward spread is suppressed. In other words, by reducing the lift of the injector 33, the radial spread of the fuel spray can be suppressed. Further, the fuel spray with small particle diameter easily decelerates by receiving the influence from the negative pressure area. Also for this reason, the spreading distance in the extending directions becomes shorter. On the other hand, when the lift of the injector 33 is high and the particle diameter of the fuel spray is large, the fuel spray becomes difficult to be attracted to the negative pressure, and as illustrated in FIG. 9B, it easily spreads radially outward. In other words, by increasing the lift of the injector 33, the radial spread of the fuel spray can be stimulated. Further, the fuel spray with the large particle diameter is difficult to decelerate by receiving the influence from the negative pressure area. Also for this reason, the spreading distance in the extending directions becomes longer.

By changing the injection interval and lift of the injector 33 as above, the spread of the fuel spray can be controlled independently in each of the two kinds of directions including the radial directions and the extending directions. Thus, with the engine 1, a first injection set including fuel injection (s) in which the lift is relatively high and the injection interval is relatively long is combined with a second injection set including fuel injection(s) in which the lift is relatively low and the injection interval is relatively short, so as to control the shape of the mixture gas layer. In each of the injection sets, a multi-stage injection including a plurality fuel injections is performed. Here, multi-stage injection means continuous fuel injections wherein the intervals (from an end of a fuel injection to a start of the next fuel injection) between each discrete pair of temporally adjacent fuel injections are 0.5 ms or shorter.

Specifically, the first injection set includes a predetermined number of fuel injections in which the lifts of the injector 33 is higher than the second injection set and the fuel injection interval is longer than in the second injection set. The negative pressure area is shrunk by extending the injection interval. Additionally, by increasing the lift and the particle diameter of the fuel spray, the kinetic momentum of the fuel spray increases. As a result, the fuel spray of which the spreading distance in the extending directions is relatively long and which spreads wide in the radial directions is formed.

The second injection set includes a predetermined number of fuel injections in which the lift of the injector 33 is lower than the first injection set and the fuel injection interval is shorter than the first injection set. The negative pressure area is enlarged by shortening the injection interval. Additionally, by reducing the lift and the particle diameter of the fuel spray, the kinetic momentum of the fuel spray decreases. As a result, the fuel spray of which the spreading distance in the extending directions is relatively short and which is suppressed in the spread in the radial directions is formed.

The engine controller 100 controls the mixture gas layer to have a shape corresponding to an operating state of the engine 1, by changing a ratio between the first and second injection sets according to the operating state of the engine 1. The basic principle is as follows: the mixture gas layer spreading radially outward is formed by increasing the ratio of the first injection set, whereas the mixture gas layer suppressed in the radially outward spread is formed by increasing the ratio of the second injection set.

Note that, depending on the operating state of the engine 1, there may be a case where the first injection set is omitted and only the second injection set is performed, a case where the first injection set only includes a single fuel injection and then the second injection set is performed, a case where the second injection set is omitted and only the first injection set is performed, and a case where the second injection set only includes a single fuel injection and the first injection set is performed. Moreover, the second injection set may be performed after the first injection set, or the first injection set may be performed after the second injection set.

Figure 10:
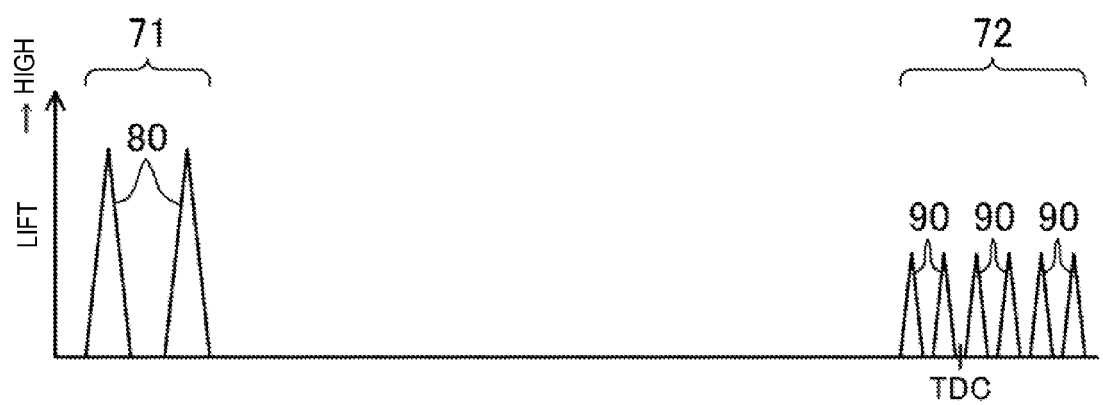
FIG. 10 is a view illustrating an injection mode within a full engine load range.
Figure 11A:
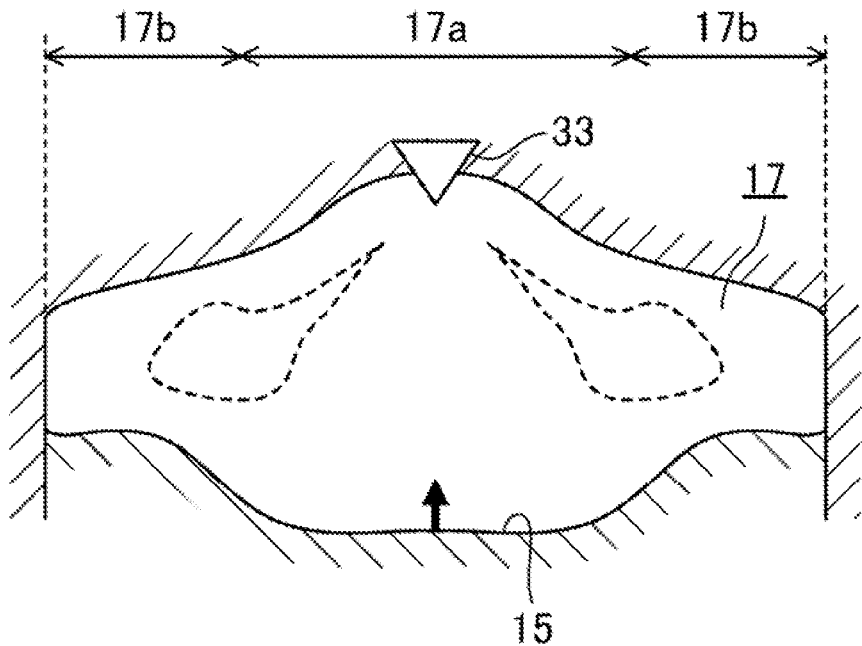
FIG. 11A is a conceptual view illustrating the fuel spray within the combustion chamber when a pre-injection is performed within the full engine load range.
Figure 11B:
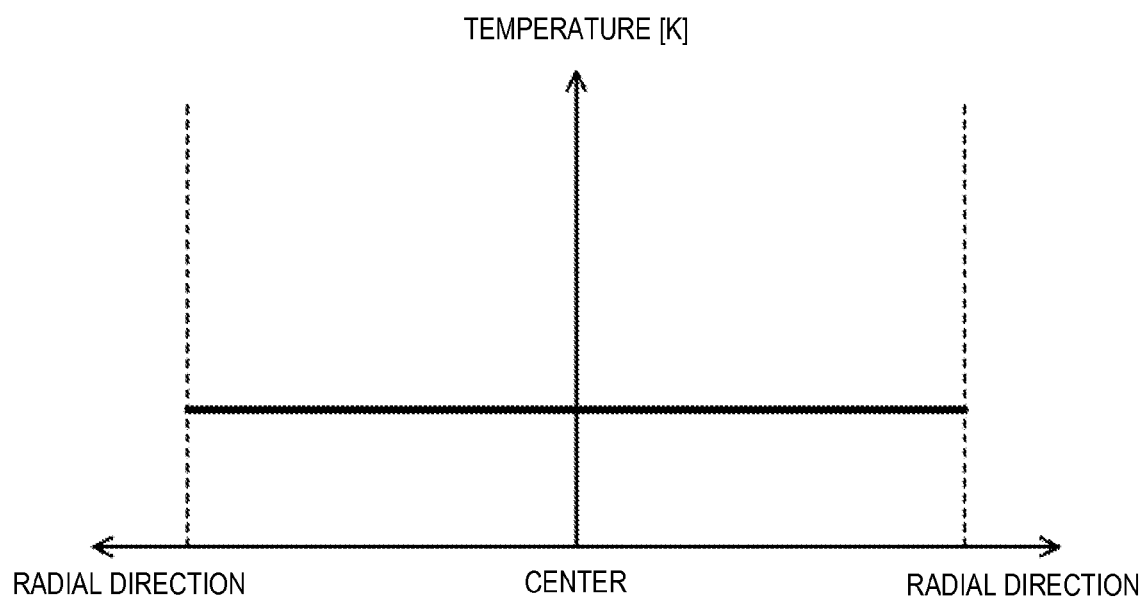
FIG. 11B is a view illustrating a temperature distribution within the combustion chamber in the state of FIG. 11A.
Figure 12A:
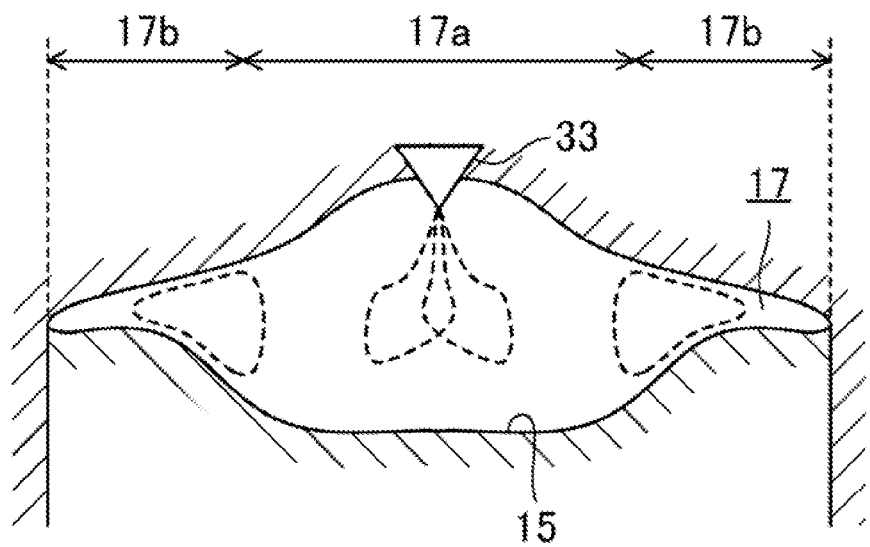
FIG. 12A is a conceptual view illustrating the fuel spray within the combustion chamber at a compression top dead center within the full engine load range.
Figure 12B:
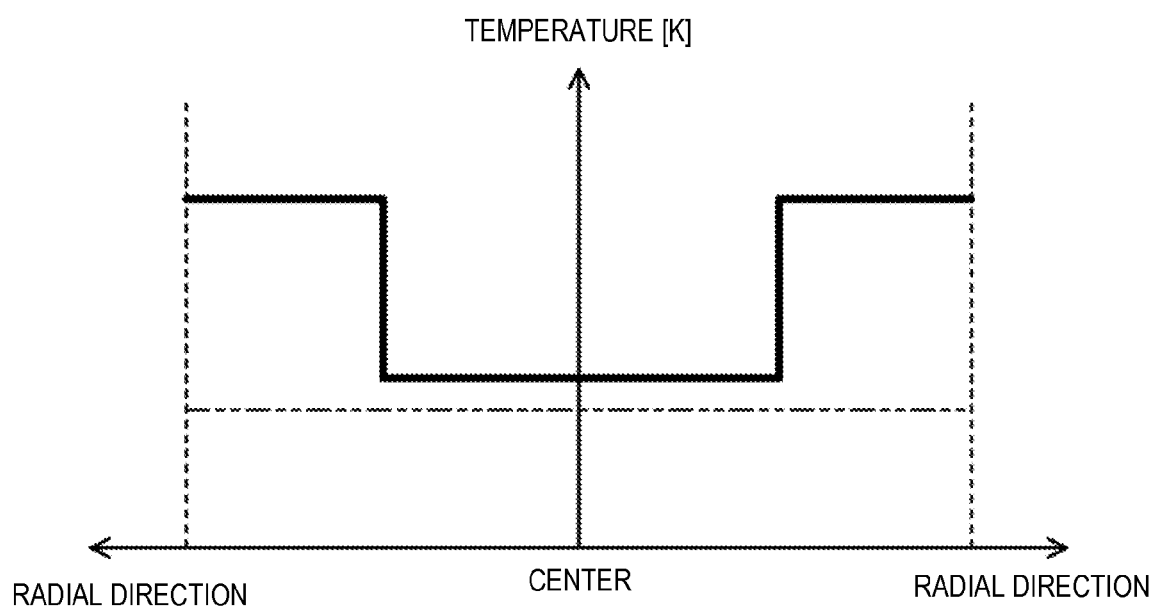
FIG. 12B is a view illustrating a temperature distribution within the combustion chamber in the state of FIG. 12A.
Figure 13A:
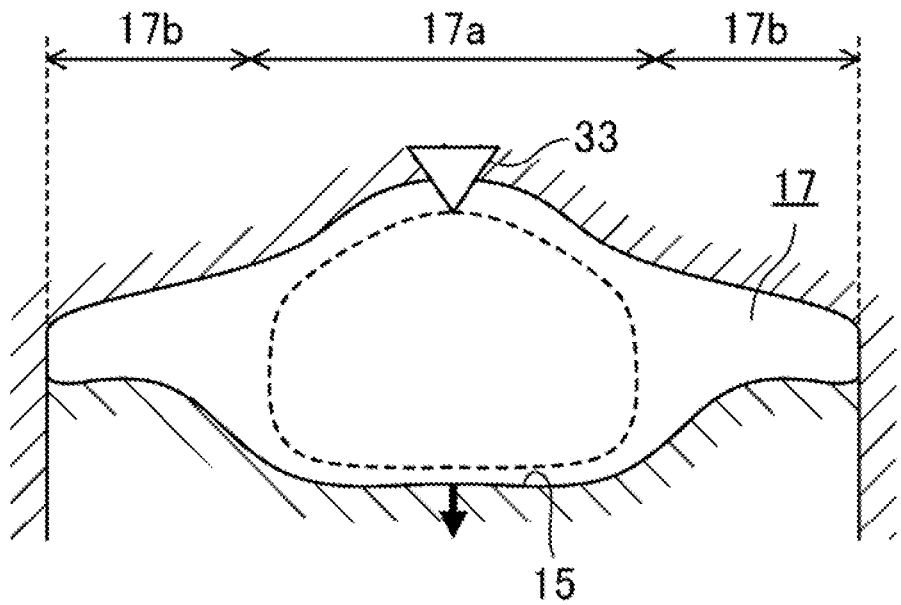
FIG. 13A is a conceptual view illustrating the fuel spray within the combustion chamber after a post injection ends within the full engine load range.
Figure 13B:
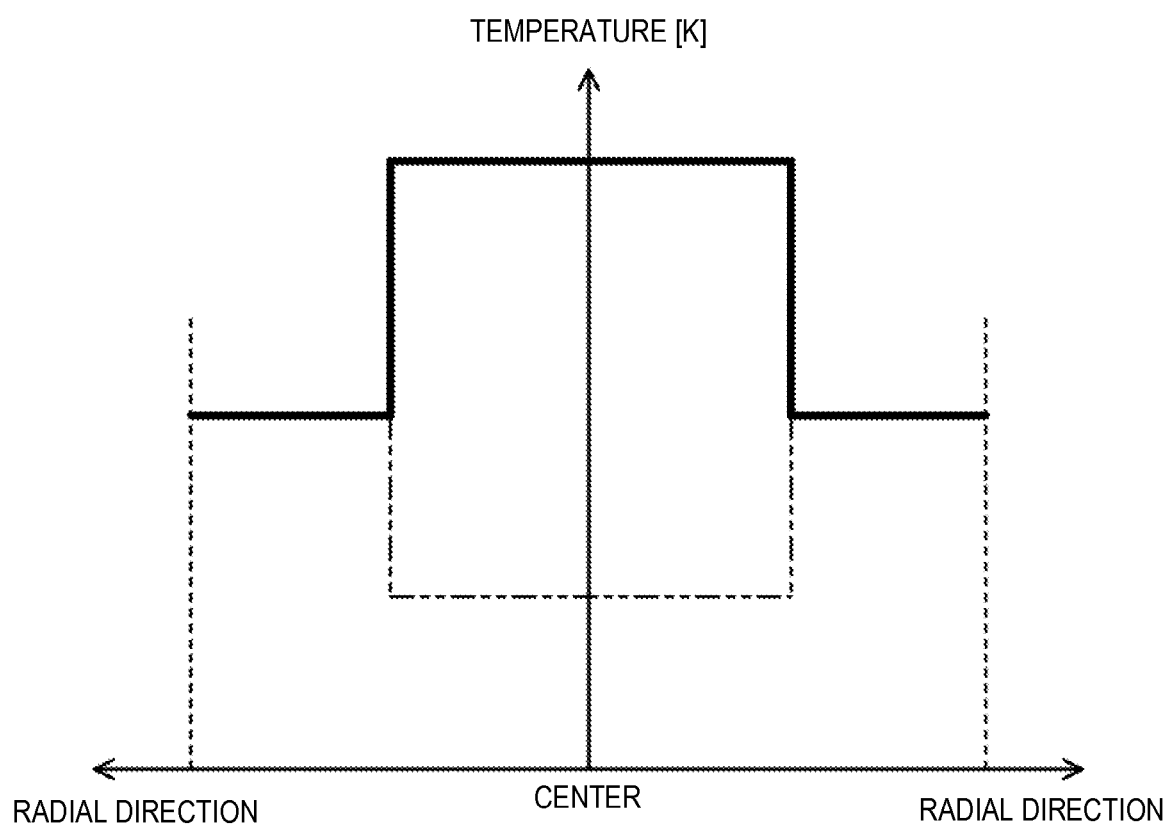
FIG. 13B is a view illustrating a temperature distribution within the combustion chamber during occurrence of a main combustion.

Based on the multi-stage injection described above, the engine controller 100 controls more finely the injection mode according to the operating state of the engine 1. FIG. 10 is a view illustrating the injection mode within a full engine load range. FIG. 11A is a conceptual view illustrating the fuel spray within the combustion chamber when a pre-injection is performed within the full engine load range, and FIG. 11B is a view illustrating a temperature distribution within the combustion chamber in the state of FIG. 11A. FIG. 12A is a conceptual view illustrating the fuel spray within the combustion chamber at a compression top dead center (CTDC) within the full engine load range, and FIG. 12B is a view illustrating a temperature distribution within the combustion chamber in the state of FIG. 12A. FIG. 13A is a conceptual view illustrating the fuel spray within the combustion chamber after a post injection ends within the full engine load range, and FIG. 13B is a view illustrating a temperature distribution within the combustion chamber during occurrence of a main combustion.

Specifically, within the full engine load range of a high engine load range in FIG. 3, the engine controller 100 causes the injector 33 to perform a pre-injection 71 and a post injection 72. The pre-injection 71 is for increasing an in-cylinder temperature, and the post injection 72 is for causing a self-ignition combustion in the expansion stroke.

Within the full engine load range, the engine controller 100 suspends a circulation of EGR gas. Although not illustrated, the engine 1 is provided with an EGR passage communicating the exhaust passage to the intake passage. The EGR valve 25 for adjusting a flow rate of the EGR gas flowing inside the EGR passage, and an EGR cooler for cooling the EGR gas flowing inside the EGR passage are provided in the EGR passage. The engine controller 100 controls the EGR valve 25 to adjust the circulation amount of the EGR gas. Further, within the full engine load range, since a request load is high and a corresponding amount of air is needed, the engine controller 100 suspends the circulation of the EGR gas.

Note that, within the high engine load range (except for in the full engine load range), the engine controller 100 circulates the EGR gas from the exhaust passage to the intake passage. Within the high engine load range, the circulated EGR gas is already cooled by the EGR cooler.

Moreover, within the full engine load range, the engine controller 100 performs a control such that an air excess ratio $\lambda$ becomes 1 or lower. In other words, within the full engine load range, the fuel amount is comparatively large.

Hereinafter, the fuel injection mode within the full engine load range is described in detail.

The pre-injection 71 is performed before a middle stage of the compression stroke. Specifically, the pre-injection 71 is performed at a timing during the compression stroke and after an intake valve of the engine 1 is closed. For example, the pre-injection 71 is performed to end at a timing that is 120° to 90° before the CTDC.

The pre-injection 71 includes multi-stage injection similar to the first injection set. Specifically, the pre-injection 71 includes a predetermined number of fuel injections 80 (two fuel injections in the example of FIG. 10) in which the lift of the injector 33 is higher than in the post injection 72 and the fuel injection interval is longer than in the post injection 72. In other words, the fuel spray of the pre-injection 71 has a large particle diameter and large kinetic momentum. Moreover, the negative pressure area created by the pre-injection 71 is relatively large. Therefore, the fuel spray of the pre-injection 71 spreads wide in the radial directions and comparatively far. At a timing at which the fuel spray of the pre-injection 71 is oxidized, the fuel spray has reached a radially peripheral section 17b of the combustion chamber 17 (i.e., a section of the combustion chamber 17 on the peripheral side in the radial directions of the cylinder 11). In other words, the pre-injection 71 is performed so that it reaches the radially peripheral section 17b by the timing at which the fuel spray is oxidized. As a result, a fuel concentration within the radially peripheral section 17b of the combustion chamber 17 is higher than a fuel concentration within a radially central section 17a of the combustion chamber 17 at the timing for the oxidative reaction of the fuel spray injected in the pre-injection 71 to occur.

Here, since the pre-injection 71 is performed after the intake valve is closed as described above, an intake air flow has calmed to some extent by the timing for the pre-injection 71 to be performed, and the fuel spray reached the radially peripheral section 17b of the combustion chamber 17 tends to remain within the radially peripheral section 17b.

The fuel amount of the pre-injection 71 is set to achieve an air-fuel ratio which causes a partial-oxidative reaction of the fuel. Here, a "partial-oxidative reaction" means an oxidative reaction of the fuel which doesn't result in a hot-flame reaction. In other words, this oxidative reaction of the fuel spray is the partial-oxidative reaction. A heat amount produced by the partial-oxidative reaction is comparatively small compared to a complete oxidative reaction, which allows prevention of the in-cylinder temperature from increasing excessively. For example, with the air-fuel ratio at which the partial-oxidative reaction of the fuel occurs, the air excess ratio $\lambda$ becomes 8 or higher. When the air excess ratio $\lambda$ is 8 or higher, the reaction of converting CO within the fuel into $CO_2$ is suppressed. In other words, although the oxidative reaction of the fuel occurs, it does not result in the hot flame reaction.

Meanwhile, the post injection 72 is started before the CTDC and ended after the CTDC. Specifically, injection start and end timings of the post injection 72 is set to a timing which causes the fuel to ignite at a predetermined retarded timing in the expansion stroke. The predetermined retarded timing is a timing at which a combustion period includes a timing at which a pressure increase rate within the cylinder 11 during the motoring becomes a largest, i.e., most negative value (lowest rate).

The post injection 72 includes multi-stage injection similar to the second injection set. The post injection 72 includes a predetermined number of fuel injections 90 (six fuel injections in the example of FIG. 10) in which the lift of the injector 33 is lower than in the pre-injection 71 and the fuel injection interval is shorter than in the pre-injection 71. In other words, the fuel spray of the post injection 72 has a small particle diameter and small kinetic momentum. Moreover, the negative pressure area created by the post injection 72 is relatively small. Therefore, the fuel spray of the post injection 72 spreads narrowly in the radial directions and the spreading distance is comparatively short. Thus, the fuel spray of the post injection 72 tends to remain within the radially central section 17a of the combustion chamber 17. As a result, the fuel concentration within the radially central section 17a of the combustion chamber 17 is higher than the fuel concentration within the radially peripheral section 17b at the timing at which the fuel spray of the post injection 72 ignites. Note that, the fuel can be determined as ignited if a combustion mass ratio of the fuel is 1% or larger, for example.

The post injection 72 is for causing a main combustion (combustion which produces a largest heat amount in a single cycle) which generates an engine torque. Therefore, the fuel amount of the post injection 72 is set according to a required torque. For example, in the post injection 72, it is preferable to inject three-fourth (¾) or more of an entire fuel amount to inject. The entire fuel amount includes the fuel amount of the pre-injection 71 and the fuel amount of the post injection 72.

The combustion of the fuel injected in such a pre-injection 71 and post injection 72 is described.

The pre-injection 71 is performed during the compression stroke as illustrated in FIG. 11A. The fuel spray of the pre-injection 71 spreads toward the radially peripheral section 17b of the combustion chamber 17 as described above. Here, as illustrated in FIG. 11B, the temperature inside the combustion chamber 17 is a predetermined temperature which is uniform in the radial directions (e.g., 1000K).

Then, as the compression stroke progresses, the temperature of the mixture gas containing the fuel spray of the pre-injection 71 increases while being compressed.

Subsequently, the post injection 72 is started at a predetermined timing before the CTDC. As described above, the fuel spray of the post injection 72 accumulates in the radially central section 17a of the combustion chamber 17 (see FIG. 12A).

Here, the fuel spray of the pre-injection 71 remains in the radially peripheral section 17b. When the in-cylinder temperature increases by the compression stroke, the oxidative reaction of the fuel spray eventually occurs. The oxidative reaction occurs near the CTDC, for example. Note that, since the oxidative reaction is the partial oxidative reaction, the oxidative reaction does not cause a significant temperature increase. Moreover, the partial oxidative reaction occurs in the combustion chamber 17, mainly in the radially peripheral section 17b. Therefore, as illustrated in FIG. 12B, the in-cylinder temperature sharply increases in the radially peripheral section 17b. For example, the temperature inside the radially peripheral section 17b increases by a few 100K. Note that, the two-dot chain line in FIG. 12B indicates the in-cylinder temperature when the pre-injection 71 is performed. Here, since the mixture gas within the radially peripheral section 17b expands due to the oxidative reaction, either the mixture gas or the air within the radially central section 17a is compressed while heat-insulated, and thereby, the temperature of either the mixture gas or the air increases. For example, the temperature of the radially central section 17a increases by a few 10K.

Note that, within the full engine load range, since the circulation of the EGR gas is suspended, the environment inside the combustion chamber 17 is in a state where the oxidative reaction of the fuel spray of the pre-injection 71 occurs comparatively easily.

On the other hand, the post injection 72 continues even during the oxidative reaction of the fuel spray of the pre-injection 71 and ends at a predetermined timing after the CTDC. As illustrated in FIG. 13A, the fuel spray of the post injection 72 gathers within the radially central section 17a of the combustion chamber 17. Since the temperature within the radially central section 17a is increased by the partial oxidative reaction of the fuel within the radially peripheral section 17b described above, for a while even after the expansion stroke starts, the temperature within the radially central section 17a is kept at a temperature at which the fuel can self-ignite. As a result, the fuel spray of the post injection 72 self-ignites after a predetermined ignition retarding period of time from the end of the injection. Thus, as illustrated in FIG. 13B, the main combustion occurs and the temperature within the radially central section 17a sharply increases. Note that, the two-dot chain line in FIG. 13B is the in-cylinder temperature while the oxidative reaction of the fuel of the pre-injection 71 occurs.

In the case of retarding the main combustion, there is normally a limit to the period of time by which it can be retarded. Specifically, as an intake stroke progresses, the in-cylinder temperature decreases due to the increase in the volume of the combustion chamber 17, and therefore, if the main combustion is excessively retarded, a misfire may occur. The decreasing speed of the in-cylinder temperature in the intake stroke is faster as the compression ratio is higher. Therefore, the retardable time period becomes shorter as the compression ratio is higher. However, by using the pre-injection 71 to maintain, even after the CTDC, the temperature within the radially central section 17a where the fuel spray of the post injection 72 is distributed, the retardable time period of the main combustion can be extended.

Note that, if the in-cylinder temperature after the CTDC becomes excessively high, the fuel injected by the post injection 72 locally ignites before being sufficiently mixed with the air inside the combustion chamber 17, and soot may be generated. However, since the section where the oxidative reaction of the fuel spray of the pre-injection 71 occurs is different from the section where the fuel spray of the post injection 72 is distributed, the excessive increase in the temperature within the distributed section of the fuel spray of the post injection 72 can be suppressed. As a result, the generation of soot by the local ignition of the fuel injected in the post injection 72 can be suppressed.

Thus, the period of the retarded main combustion (period in which the combustion mass ratio of the fuel is between 10% and 90%) includes the timing at which the pressure increase rate during the motoring becomes the largest negative value (lowest rate), or a center of gravity of the retarded main combustion has its center of gravity in a period in which the pressure increase rate of a combustion center of the self-ignition combustion is negatively large (between 10° and 20° after the CTDC). In other words, originally, the retarded self-ignition combustion occurs during the period in which the pressure increase rate is low. Therefore, the largest value of the pressure increase rate in the combustion is significantly reduced in the retarded self-ignition combustion, compared to the normal self-ignition combustion. As a result, a vibration noise (NVH) level is significantly lowered in the retarded self-ignition combustion, compared to in the normal self-ignition combustion.

Note that, as the method of reducing the pressure increase rate in the combustion, it is also possible to consider increasing an EGR amount. However, if the EGR amount is increased, the fresh air amount is reduced, and as a result, a sufficient torque may not be secured. Particularly, the pressure increase rate may become an issue within the high engine load operating range depending on the value of the rate, and a large torque is required within the high engine load operating range. In this regard, with the above configurations, the fresh air amount can be secured and thus the sufficient torque can be generated.

Thus, the engine 1 includes the engine body having the pistons 15 provided in the cylinders 11, the injectors 33 for injecting the fuel containing at least the gasoline into the cylinders 11 via the nozzle ports 41, and the engine controller 100 for controlling the injection mode of the injectors 33. Within the predetermined high engine load operating range, the engine controller 100 causes each injector 33 to perform the pre-injection 71 and the post injection 72, which is a multi-stage injection including a plurality of fuel injections performed after the pre-injection 71. In the pre-injection 71, the fuel is injected so that the fuel concentration within the radially peripheral section 17b of the combustion chamber 17 is higher than the fuel concentration within the radially central section 17a at the timing for the fuel to ignite. In the post injection 72, the fuel is injected so that the fuel concentration within the radially central section 17a of the combustion chamber 17 is higher than the fuel concentration within the radially peripheral section 17b at the timing for the fuel to ignite. The fuel injected in the post injection 72 ignites at the timing after the oxidative reaction of the fuel injected in the pre-injection 71 and after the CTDC.

According to this configuration, the fuel spray of the pre-injection 71 is mainly distributed to the radially peripheral section 17b, and the fuel spray of the post injection 72 is mainly distributed to the radially central section 17a. Then, by causing the oxidative reaction of the fuel spray of the pre-injection 71 within the radially peripheral section 17b, the temperature within the radially central section 17a can be increased but not excessively. Thus, for a while even after the CTDC, the temperature within the radially central section 17a is kept at the temperature at which the fuel can self-ignite. As a result, the fuel spray of the post injection 72 can self-ignite within the radially central section 17a at the timing retarded by a desired retarding time period. Here, since the excessive increase in the temperature within the radially central section 17a can be avoided, the generation of soot by the local ignition of the fuel injected in the post injection 72 can be suppressed.

Here, by setting the post injection 72 to be the multi-stage injection and to have the smaller lift than the pre-injection 71, the spreading distance of the fuel spray of the post injection 72 in the extending directions becomes short and the spread of the fuel spray in the radial directions is suppressed. Therefore, the fuel spray of the post injection 72 can be gathered within the radially central section 17a of the combustion chamber 17.

Other Embodiments

The illustrative embodiment of the present invention is described above. However, the present invention is not limited to this embodiment, and it can be applied to various embodiments with suitable changes, replacements, additions, omissions, etc. Moreover, a new embodiment can be obtained by combining the respective components described in the above embodiment. Furthermore, not all the components illustrated in the appended drawings and the above embodiment are essential in terms of achieving the main aim of the present invention, and they may include components which are for illustrating the present invention and unessential in terms of achieving the main aim of the present invention. Therefore, those unessential components should not instantly be recognized as essential just because they are illustrated in the appended drawings and the above embodiment.

The following configurations may be adopted to the above embodiment.

For example, the injection mode of the injector 33 is not limited to the example in FIG. 10, and it may be as follows.

The pre-injection 71 is not limited to two injections. The pre-injection 71 may include only a single injection or three or more injections. Note that, when the pre-injection 71 includes a plurality of injections, the injection interval between adjacent injections is preferably at least longer than an injection interval in the post injection 72. Moreover, the lift of the pre-injection 71 is fixed in the above embodiment; however, it may not be fixed.

The post injection 72 is not limited to six injections. The post injection 72 may include five or less injections, or seven or more injections. Moreover, the lift and the injection interval of the post injection 72 are fixed in the above embodiment; however, at least one of them may be not fixed.

Moreover, the post injection 72 only includes the fuel injections 90 in which the lift of the injector 33 is comparatively low and the injection interval is comparatively short in the above embodiment; however, the post injection 72 may include the first injection set in which the lift is relatively high and/or the injection interval is relatively long and the second injection set in which the lift is relatively low and/or the injection interval is relative short, compared to the first injection set. In the first injection set, since the effective cross-sectional area of the nozzle port is relatively large and/or the injection interval is relatively long, the fuel spray of which the spreading distance in the extending directions is relatively long and which spreads wide in the radial directions is formed. In the second injection set, since the effective cross-sectional area of the nozzle port is relatively small and/or the injection interval is relatively short, the fuel spray of which the spreading distance in the extending directions is relatively short and which is suppressed in the spread in the radial directions is formed. By including the first and second injection sets in the post injection 72, the fuel spray can be dispersed also within the radially central section.

The post injection 72 is started before the CTDC in the above embodiment; however, it may be started after the CTDC. Moreover, the oxidative reaction of the fuel injected by the pre-injection 71 is caused after the post injection 72 is started in the above embodiment; however, the post injection 72 may be started after the oxidative reaction of the fuel injected by the pre-injection 71 is started.

Moreover, the oxidative reaction of the fuel injected in the pre-injection 71 is the partial oxidative reaction in the above embodiment; however, it is not limited to this. The oxidative reaction of the fuel injected in the pre-injection 71 may be a complete oxidative reaction as long as the temperature within the radially central section 17a after the CTDC is not excessively increased.

The pre-injection 71 and the post injection 72 described above are not limited to being performed within the full engine load operating range. A similar control may be performed within the high engine load range except for the full engine load range, for example.

Figure 14:
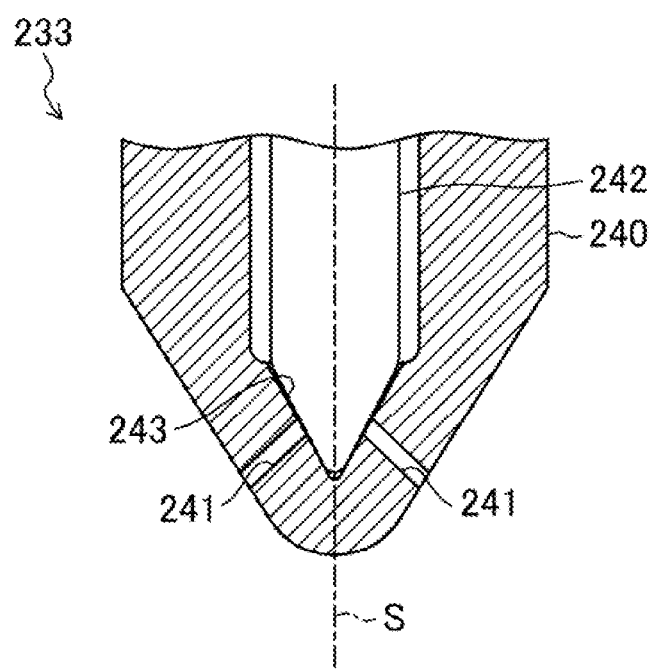
FIG. 14 is a cross-sectional view illustrating an internal structure of an injector according to another embodiment of the present invention.

Moreover, the configuration of the injector is not limited to the above embodiment. Any injector may be adopted as long as the effective cross-sectional area of the nozzle port is changeable. For example, as illustrated in FIG. 14, an injector 233 of a VCO (Valve Covered Orifice) nozzle type may be adopted. FIG. 14 is a cross-sectional view illustrating an internal structure of the injector 233.

Specifically, the injector 233 has a nozzle body 240 formed with a nozzle port 241 from which the fuel is injected into the cylinder 11, and a needle valve 242 for opening and closing the nozzle port 241. The nozzle body 240 is a tubular member extending along the central axis S and the fuel flows inside the nozzle body 240. A tip portion of the nozzle body 240 has a circular cone shape. A mortar-like seat portion 243 is formed in an inner circumferential surface of the tip portion of the nozzle body 240. A plurality of nozzle ports 241 are formed to penetrate the tip portion of the nozzle body 240. One end of the nozzle port 241 is opened to the seat portion 243. The nozzle port 241 includes a plurality of ports formed around the central axis S at an even interval. A tip portion of the needle valve 242 has a circular cone shape and is seated on the seat portion 243 of the nozzle body 240. The nozzle port 241 is closed by seating the needle valve 242 on the seat portion 243. The nozzle port 241 is an example of the nozzle port of the injector, and the needle valve 242 is an example of the valve body.

The needle valve 242 is operated by a piezo element similarly to the injector 33. When the needle valve 242 is operated and lifted from the seat portion 243, a gap through which the fuel can flow is formed between the seat portion 243 and the needle valve 242, and the fuel flowing through the gap is injected outside the nozzle body 240 via the nozzle port 241.

Here, a cavitation is formed in the inner circumferential surface of the nozzle port 241 when the fuel flows thereon. A size of the cavitation (e.g., the size of the area where the cavitation is formed) changes based on the gap between the needle valve 242 and the seat portion 243, in other words, based on the lift of the needle valve 242. Specifically, when the lift of the needle valve 242 is low and the gap between the needle valve 242 and the seat portion 243 is narrow, the area where the cavitation is formed becomes large. On the other hand, when the lift of the needle valve 242 is high and the gap between the needle valve 242 and the seat portion 243 is wide, the area where the cavitation is formed becomes small. When the area where the cavitation is formed is large, the effective cross-sectional area of the nozzle port 241 becomes small, and when the area where the cavitation is formed is small, the effective cross-sectional area of the nozzle port 241 becomes large. In other words, the effective cross-sectional area of the nozzle port 241 becomes smaller as the lift of the needle valve 242 becomes lower, and the effective cross-sectional area of the nozzle port 241 becomes larger as the lift of the needle valve 242 becomes higher.

Further, in the above embodiment, by changing the lift and the fuel injection interval of the injector 33, the shape of the mixture gas layer inside the combustion chamber 17 can be changed. In addition, the fuel pressure may be increased to change the shape of the mixture gas layer. By increasing the fuel pressure, the changeable range in which the shape of the mixture gas layer can be changed due to the changes of the lift and the fuel injection interval of the injector 33 can be expanded more. Specifically, by increasing the fuel pressure, when the lift of the injector 33 is increased, the increase of the kinetic energy of the fuel spray becomes larger, and when the fuel injection interval is shortened, the negative pressure increases and the negative pressure area enlarges even more. As a result, the changeable range of the shape of the mixture gas layer is expanded even larger.

Note that, in the above embodiment, the heat-insulating structures of the combustion chamber 17 and the intake ports 18 are adopted and the heat-insulating layer is formed inside the cylinder (combustion chamber 17) by the gas layer; however, the present invention may also be applied to engines without the heat-insulating structures of the combustion chamber 17 and the intake ports 18.

Moreover, in the fuel injection art of the above embodiment of the present invention, the mixture gas layer is formed within the combustion chamber 17 and the gas layer is formed around the mixture gas layer; however, the present invention is not limited to this. Even in the case where the gas layer does not exist and the mixture gas layer has contact with the wall surface of the combustion chamber 17, the fuel injection art can be adopted. For example, when the fuel injection amount is increased with respect to the volume of the combustion chamber 17, the mixture gas layer may have contact with the wall surface of the combustion chamber 17. Even in such a case, the heat amount produced near the center of the combustion chamber 17 is increased and the heat amount produced near the wall surface of the combustion chamber 17 is suppressed, so as to suppress the release of heat from the wall surface of the combustion chamber 17, and as a result, the cooling loss can be reduced.

As described above, the present invention is useful for control devices of gasoline direct-injection engines.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

DESCRIPTION OF REFERENCE CHARACTERS

1 Engine
11 Cylinder
15 Piston
17 Combustion Chamber
17a Radially Central Section
17b Radially Peripheral Section
33 Injector
40 Nozzle Body
41 Nozzle Port
42 Outward-Opening Valve (Valve Body)
71 Pre-injection
72 Post Injection
100 Engine Controller (Controller)
233 Injector
241 Nozzle Port
242 Needle Valve (Valve Body)
S Central Axis
X Central Axis

What is claimed is:

1. A control device of a gasoline direct-injection engine, comprising:
    an engine body having a piston provided in a cylinder;
    an injector for injecting a fuel containing at least gasoline, into the cylinder through a nozzle port; and
    a controller for controlling an injection mode of the injector,
    wherein within a predetermined high load operating range of the engine body, the controller causes the injector to perform a pre-injection and a post injection in which a multi-stage injection is performed, the multi-stage injection including a plurality of fuel injections that are performed after the pre-injection,
    wherein in the pre-injection, the fuel is injected to cause a fuel concentration within a radially peripheral section inside the cylinder to be higher than a fuel concentration within a radially central section inside the cylinder at a timing for the fuel to ignite,
    wherein in the post injection, the fuel is injected to cause the fuel concentration within the radially central section inside the cylinder to be higher than the fuel concentration within the radially peripheral section at a timing for the fuel to ignite,
    wherein the timing for the fuel injected in the post injection to ignite is after an oxidative reaction of the fuel injected in the pre-injection occurs and after a compression top dead center, and
    wherein the post injection is started before the compression top dead center and ended after the compression top dead center.

2. The control device of claim 1, wherein the injector adjusts an effective cross-sectional area of the nozzle port, and
    wherein the post injection includes a plurality of fuel injections in which the effective cross-sectional area of the nozzle port is smaller than it is in the pre-injection.

3. The control device of claim 2, wherein the injector includes a nozzle body formed with the nozzle port, and a valve body for opening and closing the nozzle port, and the effective cross-sectional area of the nozzle port changes according to a lift of the valve body.

4. The control device of claim 2, wherein an air excess ratio is set to be 1 or lower within the predetermined high load operating range where the pre-injection and the post injection are performed.

5. The control device of claim 2, wherein an EGR gas is not circulated into the cylinder within the predetermined high load operating range where the pre-injection and the post injection are performed.

6. The control device of claim 5, wherein the post injection is started before the compression top dead center and ended after the compression top dead center.

7. The control device of claim 5, wherein an air excess ratio is set to be 1 or lower within the predetermined high load operating range where the pre-injection and the post injection are performed.

8. The control device of claim 1, wherein an EGR gas is not circulated into the cylinder within the predetermined high load operating range where the pre-injection and the post injection are performed.

9. The control device of claim 1, wherein an air excess ratio is set to be 1 or lower within the predetermined high load operating range where the pre-injection and the post injection are performed.

10. A control device of a gasoline direct-injection engine, comprising:
    an engine body having a piston provided in a cylinder;
    an injector for injecting fuel containing at least gasoline, into the cylinder through a nozzle port; and
    a controller for controlling an injection mode of the injector,
    wherein the injector adjusts an effective cross-sectional area of the nozzle port,
    wherein within a predetermined high load operating range of the engine body, the controller causes the injector to perform a pre-injection and a post injection a multi-stage injection is performed, the multi-stage injection including a plurality of fuel injections that are performed after the pre-injection,
    wherein the post injection includes a plurality of fuel injections in which the effective cross-sectional area of the nozzle port is relatively smaller than that in the pre-injection, and the post injection is performed such that the fuel injected in the post injection ignites at a timing after an oxidative reaction of the fuel injected in the pre-injection occurs and after a compression top dead center, and
    wherein the post injection is started before the compression top dead center and ended after the compression top dead center.

11. The control device of claim 10, wherein an EGR gas is not circulated into the cylinder within the predetermined high load operating range where the pre-injection and the post injection are performed.

12. The control device of claim 10, wherein an air excess ratio is set to be 1 or lower within the predetermined high load operating range where the pre-injection and the post injection are performed.

* * * * *